(12) United States Patent
Katz et al.

(10) Patent No.: US 12,111,815 B2
(45) Date of Patent: Oct. 8, 2024

(54) CORRELATING EVENT DATA ACROSS MULTIPLE DATA STREAMS TO IDENTIFY COMPATIBLE DISTRIBUTED DATA FILES WITH WHICH TO INTEGRATE DATA AT VARIOUS NETWORKED COMPUTING DEVICES

(71) Applicant: Sightly Enterprises, Inc., San Diego, CA (US)

(72) Inventors: Adam Eric Katz, New York, NY (US); Aman Raghuvanshi, Monmouth Junction, NJ (US); Adam Jarrell Smith, San Diego, CA (US); Jacob Maximillian Miesner, New York, NY (US)

(73) Assignee: Sightly Enterprises, Inc., New York, NY (US)

( * ) Notice: Subject to any disclaimer, the term of this patent is extended or adjusted under 35 U.S.C. 154(b) by 0 days.

(21) Appl. No.: 17/314,643

(22) Filed: May 7, 2021

(65) Prior Publication Data
US 2022/0358115 A1 Nov. 10, 2022

(51) Int. Cl.
G06F 16/23 (2019.01)
(52) U.S. Cl.
CPC .................. *G06F 16/2365* (2019.01)
(58) Field of Classification Search
CPC ................................................ G06F 16/2365
See application file for complete search history.

(56) References Cited

U.S. PATENT DOCUMENTS

| 2017/0006135 A1* | 1/2017 | Siebel | G06Q 10/06 |
| 2019/0362317 A1* | 11/2019 | Rogynskyy | G06F 16/182 |
| 2020/0250249 A1* | 8/2020 | Fedoryszak | H04L 51/52 |
| 2020/0302919 A1* | 9/2020 | Greborio | G10L 15/30 |
| 2021/0157858 A1* | 5/2021 | Stevens | G06F 40/237 |

(Continued)

OTHER PUBLICATIONS

U.S. Appl. No. 17/314,630, May 7, 2021, Adam Eric Katz, Entire Document.

(Continued)

*Primary Examiner* — Taelor Kim
(74) *Attorney, Agent, or Firm* — KOKKA & BACKUS, PC

(57) ABSTRACT

Various embodiments relate generally to data science and data analysis, computer software and systems, to provide a platform to facilitate updating compatible distributed data files, among other things, and, more specifically, to a computing and data platform that implements logic to facilitate correlation of event data via analysis of electronic messages, including executable instructions and content, etc., via a cross-stream data processor application configured to, for example, update or modify one or more compatible distributed data files automatically. In some examples, a method may include activating APIs to receive via a message throughput data pipe different data streams, extracting features from data using the APIs, identifying event-related data across data sources, correlating the event-related data to form data representing an even, classifying event-related data into a state classification, determining compatible data at data sources, identifying compatible data, and transmitting integration data to integrate with a data source.

20 Claims, 15 Drawing Sheets

(56) References Cited

U.S. PATENT DOCUMENTS

2022/0138489 A1* 5/2022 Ye .................. G06K 9/6215
382/159

OTHER PUBLICATIONS

U.S. Appl. No. 17/314,646, May 7, 2021, Adam Eric Katz, Entire Document.
Joseph, Seb, 'Media responsibility is now corporate social responsibility': Marketers reassess brand safety controls to navigate a divided America, Brands in Culture, Digiday, Published Jan. 20, 2021, URL: https://digiday.com/?p=388931.
Southern, Lucinda, Blocklists Are 'Surgery With a Guillotine,' So Dow Jones Built a Brand Safety Tool, Digital Transformation, AdWeek, Published Oct. 30, 2020, URL: https://www.adweek.com/media/dow-jones-brand-safety-tool-triples-ad-inventory/.

* cited by examiner

CORRELATING EVENT DATA ACROSS MULTIPLE DATA STREAMS TO IDENTIFY COMPATIBLE DISTRIBUTED DATA FILES WITH WHICH TO INTEGRATE DATA AT VARIOUS NETWORKED COMPUTING DEVICES

FIELD

Various embodiments relate generally to data science and data analysis, computer software and systems, and control systems to provide a platform to facilitate updating compatible distributed data files, among other things, and, more specifically, to a computing and data platform that implements logic to facilitate correlation of event data via analysis of electronic messages, including executable instructions and content, etc., via a cross-stream data processor application configured to, for example, update or modify one or more compatible distributed data files automatically.

BACKGROUND

Advances in computing hardware and software have fueled exponential growth in delivery of vast amounts of information due to increased improvements in computational and networking technologies. Also, advances in conventional data network technologies provide an ability to exchange increasing amounts of generated data via various electronic messaging platforms. Thus, improvements in computing hardware, software, network services, and storage have bolstered growth of Internet-based messaging applications, such as social networking platforms and applications, especially in a technological area aimed at exchanging digital information concerning products and services expeditiously. As an example, various organizations and corporations (e.g., retailer sellers) may exchange information through any number of electronic messaging networks, including social media networks (e.g., Twitter® and Reddit™), as well as user-generated content (e.g., YouTube®) and news-related web sites. Such entities aim to provide time-relevant data and content to users online to manage brand loyalty and reputation, and to enhance customer engagement.

And since different audiences and users prefer consuming content over different communication channels and various different data networks, traditional implementations of computing systems and computer-implemented processes have various drawbacks. Hence, traditional approaches are not well-suited to update distributed data files to optimize engagement with customers and potential customers in ever-increasingly dynamic computing environments. For example, traditional computing architectures typically require executable code to be deployed and maintained on a server, whereby some conventional server architectures hinder scalability. Known server architectures also may be single threaded. Examples of single threaded servers include conventional database servers, such as SQL servers (e.g., a PostgreSQL server). As a result, calls to application programming interfaces ("APIs") are processed sequentially, which further hinders scalability. Consequently, traditional server architectures and processes are not well-suited to update distributed data files and content in real-time (or near real-time).

Thus, what is needed is a solution for facilitating techniques that optimizes computer utilization and performance associated with updating data files and content via an electronic messaging service, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1:
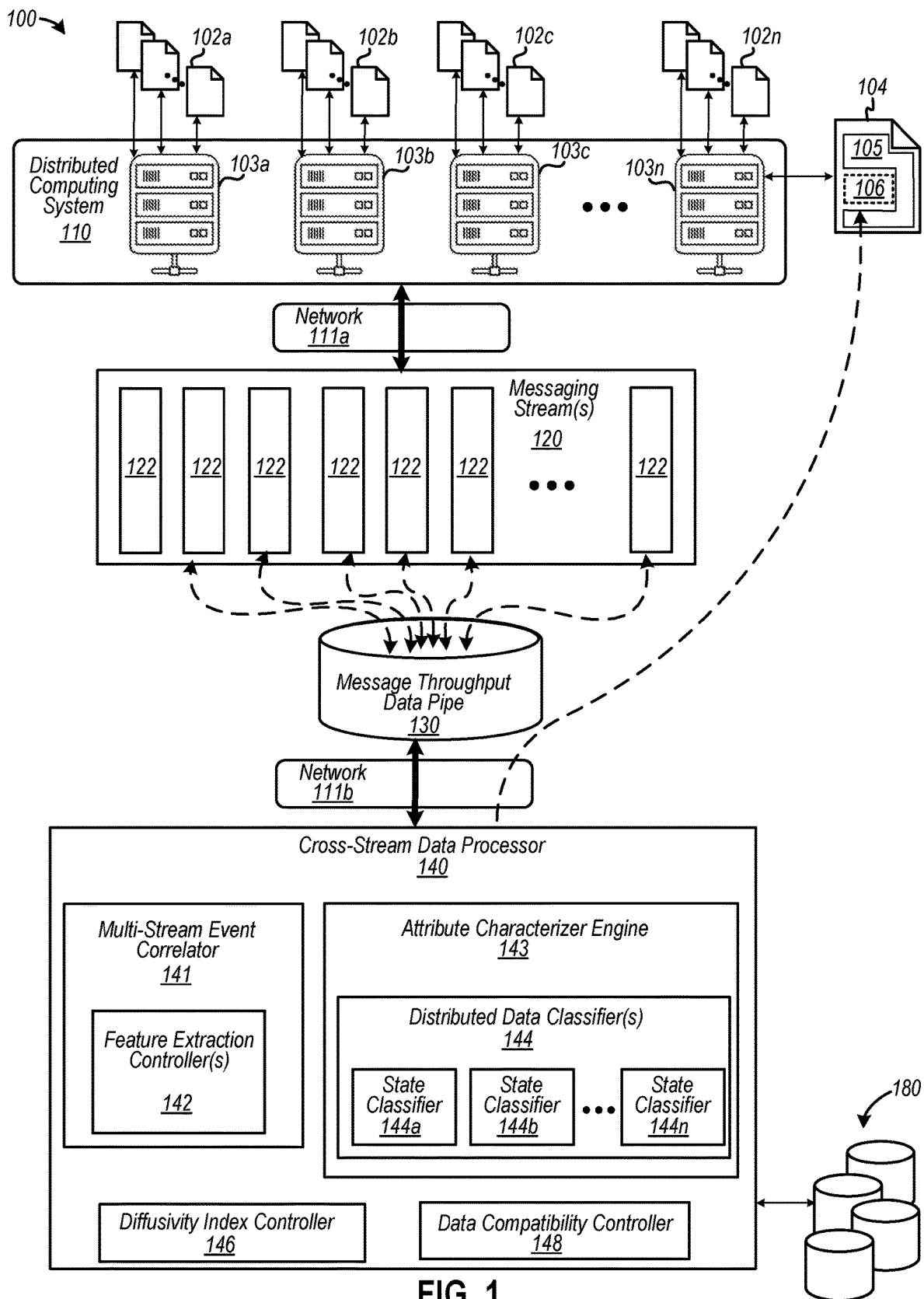
FIG. 1 is a diagram depicting a cross-stream data processor configured to automatically update or modify one or more compatible distributed data files, according to some embodiments.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to, a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures configured to store data in various computer programming languages and formats in accordance with various types of structured and unstructured database schemas such as SQL, MySQL, NoSQL, DynamoDB™, etc. Also applicable are computer programming languages and formats similar or equivalent to those developed by data facility and computing providers such as Amazon® Web Services, Inc. of Seattle, Washington, FMP, Oracle®, Salesforce.com, Inc., or others, without limitation or restriction to any particular instance or implementation. DynamoDB™, Amazon Elasticsearch Service, Amazon Kinesis Data Streams ("KDS")™, Amazon Kinesis Data Analytics, and the like, are examples of suitable technologies provide by Amazon Web Services ("AWS"). Another example of cloud computing services include the Google® cloud platform that may implement a publisher-subscriber messaging service (e.g., Google® pub/sub architecture).

Further, references to databases, data structures, or any type of data storage facility may include any embodiment as a local, remote, distributed, networked, cloud-based, or combined implementation thereof. For example, social networks and social media (e.g., "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering (e.g., user-generated content, such as deployed on YouTube®), content sharing, or like purposes. Data may be generated in various formats such as text, audio, video (including three dimensional, augmented reality ("AR"), and virtual reality ("VR")), or others, without limitation, for use on social networks, social media, and social applications (e.g., "social media") such as Twitter® of San Francisco, California, Snapchat® as developed by Snap® of Venice, California, Messenger as developed by Facebook®, WhatsApp®, or Instagram® of Menlo Park, California, Pinterest® of San Francisco, California, LinkedIn® of Mountain View, California, and others, without limitation or restriction. In various embodiments, the term "content" may refer to, for example, one or more of executable instructions (e.g., of an application, a program, or any other code compatible with a programming language), textual data, video data, audio data, or any other data.

In some examples, data may be formatted and transmitted (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Streaming SQL applications, browser applications (e.g., Firefox™) and/or web applications, among others. In some example, a browser application may implement a JavaScript framework, such as Ember.js, Meteor.js, ExtJS, AngularJS, and the like. References to various layers of an application architecture (e.g., application layer or data layer) may refer to a stacked layer application architecture such as the Open Systems Interconnect ("OSI") model or others. As described herein, a distributed data file may include executable instructions as described above (e.g., JavaScript® or the like) or any data constituting content (e.g., text data, video data, audio data, etc.), or both.

In some examples, systems, software, platforms, and computing clouds, or any combination thereof, may be implemented to facilitate online distribution of subsets of units of content, postings, electronic messages, and the like. In some cases, units of content, electronic postings, electronic messages, and the like may originate at social networks, social media, and social applications, or any other source of content.

FIG. 1 is a diagram depicting a cross-stream data processor configured to automatically update or modify one or more compatible distributed data files, according to some embodiments. Diagram 100 depicts an example of a cross-stream data processor 140 configured to extract data from (or associated with) data files 102a to 102n, which may be generated and hosted at distributed data sources 103a to 103n, respectively, of a distributed computing system 110. Extracted data, such as feature data, may be received from any number of distributed data sources 103a to 103n into cross-stream data processor 140 via one or more networks 111a and 111b and a message throughput data pipe 130. As shown, cross-stream data processor 140 may be configured to receive electronic message data across any number of data streams 122 of messaging streams 120, and further configured to analyze electronic message data to detect patterns of data. Cross-stream data processor 140 also may be configured to correlate patterns of data over multiple data streams 122 to identify event data constituting one or more "events." Data associated with data files 102a to 102n may be classified to determine compatibility of integrating updated or modified executable instructions and content data in one or more compatible data files 102a to 102n. As shown, cross-stream data processor 140 may be configured to determine data file 104 includes data 105 that may be compatible with integration data 106, which may configured to integrated data to modify distributed data file 104. Thus, modified data file 104 may be configured to function or behave differently upon receiving integration data 106.

In various examples, message throughput data pipe 130 implements an asynchronous messaging service that may be configured to scale data throughput to sufficiently extract feature data and identify events (and event data) in real-time (or near real-time) over large amounts of data. Thus, message throughput data pipe 130 may facilitate expeditious identification of compatible data files 102a to 102n with which to integrate executable instructions and/or content data responsive to detection of an event. In some examples, cross-stream data processor 140 may be configured to determine prevalence and influence (e.g., functional influence) of event data across multiple data sources for purposes of identifying data files 102a to 102n that may be configured to automatically accept integration data 106. In some cases, prevalence and influence of event data across multiple data sources 103a to 103n may be computed based on a rate of diffusivity of event-related data in each data source 103 and across a number of data files 102a to 102n.

In at least one example, distributed data sources 103a to 103n may include repositories of executable instructions, such as GitHub™, Inc., or any other data repository (e.g., repositories of APIs). In some examples, distributed data sources 103a to 103n may be configured to render user-generated content, such as audio or video deployed on YouTube®-based computing platforms or Spotify®-based computing platforms. Also, distributed data sources 103a to 103n may be configured to implement social networks, social media, and social applications (e.g., "social media") such as Twitter® of San Francisco, California, Reddit® of San Francisco, California, Snapchat® as developed by Snap® of Venice, California, Messenger services as developed by Facebook®, WhatsApp®, or Instagram® of Menlo Park, California, Pinterest® of San Francisco, California, LinkedIn® of Mountain View, California, and others, without limitation or restriction. Also, distributed data sources 103a to 103n may be configured to generate and host any other type of digital content, such as email, text messaging (e.g., via SMS messaging, Multimedia Messaging Service ("MMS"), WhatsApp™, WeChat™ Apple® Business Chat™, Instagram™ Direct Messenger, etc.), and web pages (e.g., news websites, retailer websites, etc.). Additionally, distributed data sources 103a to 103n may be configured to generate and host content data, such as a "smart TV" data (e.g., a television or display with an internet connection and media platform), or data generated by a connected media device (e.g., an OTT, or "over the top" device), such as devices that interface with a TV or media player and is connected to the internet, which enables applications and video streaming. Examples of OTT devices include Amazon Fire Stick®, Apple TV, Roku®, and the like. Distributed data sources 103a to 103n may also include gaming consoles, such as Nintendo® Switch, Xbox®, Sony Playstation®, among others.

Diagram 100 depicts cross-stream data processor 140 including a multi-stream event correlator 141, an event attribute characterizer engine 143, a diffusivity index controller 146, and a data compatibility ability controller 148. Multi-stream event correlator 141 may be configured to identify event data for correlating with other similar event data across any number of distributed data files 102a to 102n. As shown, multi-stream event correlator 141 may include one or more feature extraction controllers 142 each of which may be configured to identify and extract feature data (e.g., units of data) to detect patterns of data that may be used to constitute an event. In some examples, feature data may include units of text (e.g., words or tokens), units of image data (e.g., an amount of pixels, or matched image data), units of audio data, and the like. Diffusivity index controller 146 may be configured to compute a value representing a rate of diffusivity of event data based on detected features and supplemental data, which may include metadata. Once cross-stream data processor 140 identifies event data associated with a subset of distributed data files 102a to 102n, attribute characterizer engine 143 may be configured to characterize attribute data in distributed data files 102a to 102n to determine a degree of compatibility of a target data file 104 for accepting integration data 106. Distributed data classifiers 144 may include one or more state classifiers 144a to 144n, each being configured to characterize one or more types of state and state values associated with content 105 to determine compatibility of data file 104. Data compatibility controller 148 may be configured to filter state data, as computed by state classifiers 144a to 144n, in accordance with compatibility rule data to determine whether a distributed data file is compatible. Compatibility rule data may be stored in repository 180. In some examples, repository 180 also includes various subsets of data to be integrated into distributed data files of data sources based on whether a subset of data to be integrated into specific data source is compatible with the content of that data source.

In view of the foregoing, structures and/or functionalities depicted in FIG. 1 as well as other figures herein, may be implemented as software, applications, executable code, application programming interfaces ("APIs"), processors, hardware, firmware, circuitry, or any combination thereof.

Figure 2:
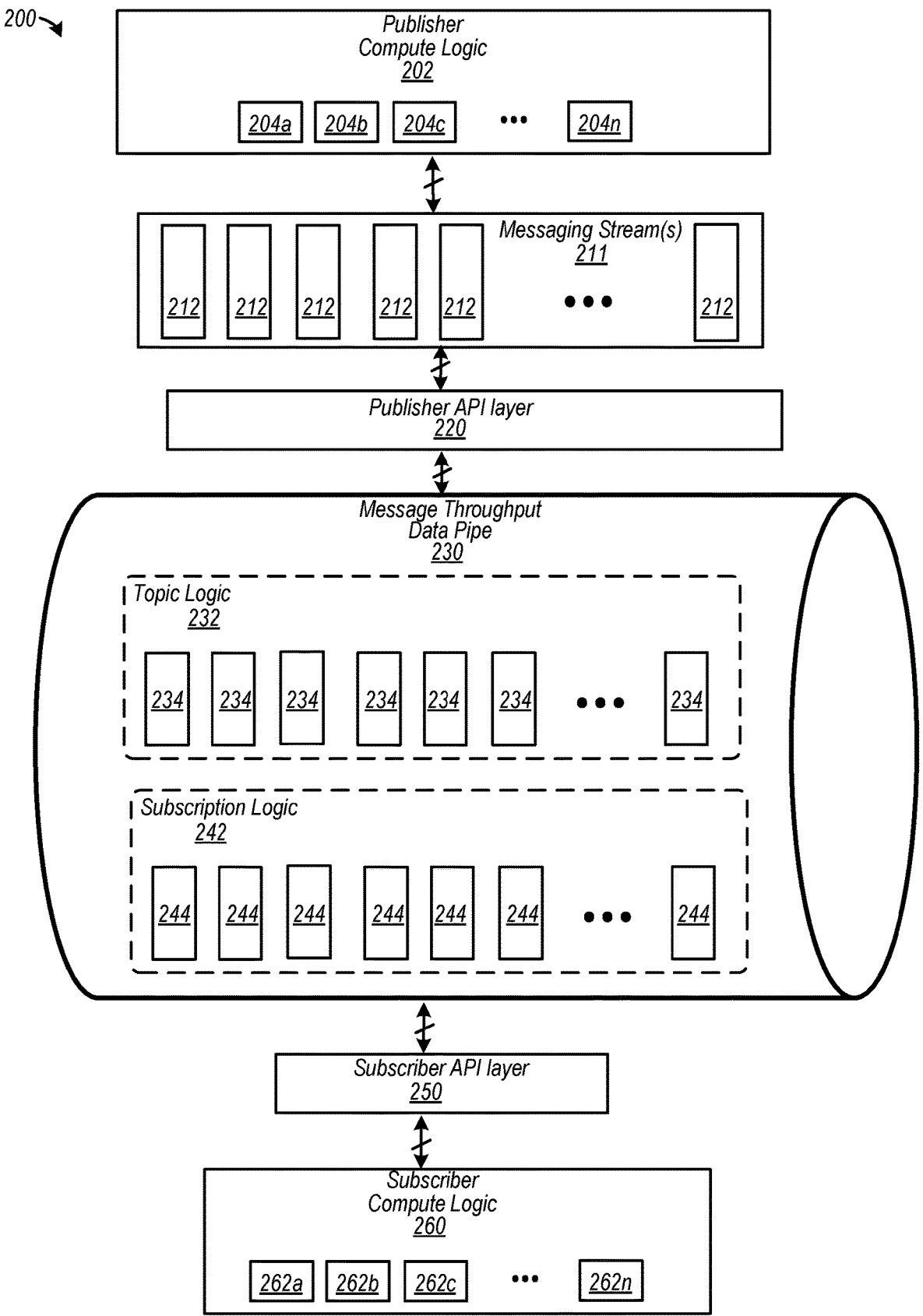
FIG. 2 depicts an example of a messaging service, according to some examples.

FIG. 2 depicts an example of a messaging service, according to some examples. Diagram 200 depicts a messaging service architecture including publisher compute logic 202 to publish electronic messages via data streams 212 of messaging streams 211. In some examples, publisher compute logic 202 may include any number of publisher processes ("publishers") 204a to 204n to communicate with any number of distributed data sources and distributed computing devices (not shown). In various examples, publisher compute logic 202 may be disposed at distributed computing systems, at a publisher API layer 220, or at anywhere among networked computing systems and storage.

As shown, publisher processes 204a to 204n may be coupled via publisher application programming interface ("API") layer 220, which may include one or more publisher APIs, to topic logic 232 of a message throughput data pipe 230. In some examples, one or more topic processes ("topics") 234 of topic logic 232 may be linked to communication logic that may correspond with a data stream 212 in messaging streams 211. In at least one case, a topic may be referred to as a named entity that represents a feed of messages (e.g., a data stream 212). Further, message throughput data pipe 230 may also include subscription processes ("subscriptions") 244 of subscription logic 242. Subscriptions 244 may be configured to receive messages from a subscribed topic 234 for conveying via one or more APIs in subscriber API layer 250 to a number of subscriber processes ("subscribers") 262a to 262n. According to some examples, APIs in publisher API layer 220 and subscriber API layer 250 may be implemented as REST APIs, RPC APIs, or any other suitable format or protocol.

Publishers 204a to 204n and subscribers 262a to 262n may include hardware (e.g., processors and memory), software, or a combination thereof, and may be configured to exchange data with one or more computing devices to facilitate operation of a cross-stream data processor, according to some examples. According to various examples, messaging service architecture of diagram 200 may be configured to provide daily throughput volume of more than 28 million API units (e.g., more than 14 million channels in 24 hours), whereby an API unit may include text of a document with less than (or equal to) 1,000 Unicode characters. In some examples, publishers 204a to 204n each may be implemented to provide a throughput of 12,000,000 kB per minute (e.g., 200 MB/s), or greater, and subscribers 262a to 262n each may be implemented to provide a throughput of 24,000,000 kB per minute (e.g., 400 MB/s), or greater.

According to at least some embodiments, the above-described elements of a messaging service may be implemented in accordance with an architecture and/or framework similar to, or consistent with, a publish-subscribe messaging service architecture provided by Google® as Google Cloud Pub/Sub, which is developed by Google of Mountain View, California In some cases, messaging service architecture of diagram 200 may also implement an Apache® Kafka™ messaging system, which is maintained by the Apache Software Foundation, at www(.)apache(.)org, or a variant thereof.

Note that elements depicted in diagram 200 of FIG. 2 may include structures and/or functions as similarly-named or similarly-numbered elements depicted in other drawings.

Figure 3:
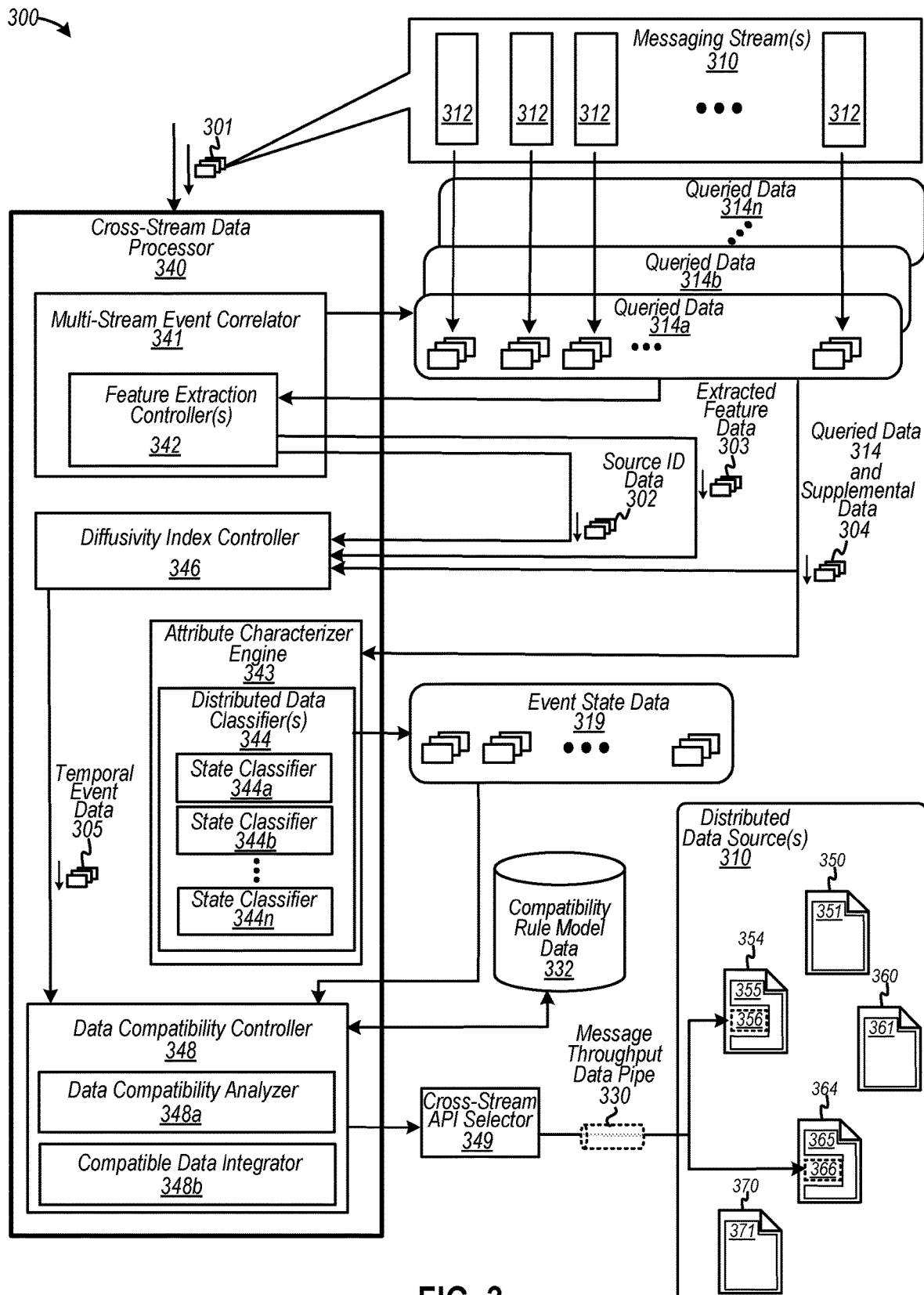
FIG. 3 is a diagram depicting a functional block diagram of a cross-stream data processor, according to some examples.

FIG. 3 is a diagram depicting a functional block diagram of a cross-stream data processor, according to some examples. Diagram 300 depicts another example of a cross-stream data processor 340, which includes a multi-stream event correlator 341, which is shown to include feature extraction controllers 342, a diffusivity index controller 346, an attribute characterizer engine 343, which is shown to include state classifiers 344a to 344n of a distributed data classifier 344, and a data compatibility controller 348. Note that elements depicted in diagram 300 of FIG. 3 may include structures and/or functions as similarly-named or similarly-numbered elements depicted in other drawings.

In operation, cross-stream data processor 340 may be configured to receive data 301 as multiple data streams or data channels of message stream 310. In some embodiments, data 301 may be temporarily stored in memory (e.g., cloud storage) and queried in batches. As shown, queried data 314a to 314n may represent batches of data queried at different ranges of time to extract features and determine event data (e.g., for an interval of time). In the example shown, feature extraction controllers 342 may be configured to generate extracted feature data 303, such as text or tokenized characters, that may be associated with corresponding source identifier ("ID") data 302 to identify one or more specific data sources from which extracted feature data 303 is determined. Note that a subset of event data may be associated with multiple source identifiers, thereby indicating multiple target data files for integrating data in accordance with various examples. Extracted feature data 303 and source ID data 302 may be provided to diffusivity index controller 346, along with queried data (e.g., data from a data source) and supplemental data 304. In some cases, either queried data 314 or supplemental data 304, or both, may optionally be passed to diffusivity index controller 346. Supplemental data 304 may include data identified as metadata that is generated by a data source, an API, or other code or executable instructions. As shown, diffusivity index controller 346 may be configured to identify diffusive data representing propagation of event-related data among various computing platforms, and may be further configured to generate temporal event data 305. Temporal event data 305 may identify event data of particular interest across multiple data streams 312 (and across associated distributed data sources) for a particular range of time.

Attribute characterizer engine 343 may be configured to receive one or more of data 302, data 303 and data 304 to characterize data files at distributed data sources. For example, distributed data files including code or executable instructions may be characterized as being of a type of a programming language (e.g., JavaScript), as having a certain functionality for which code or executable instructions may be implemented, or having any other attribute or value of attribute associated with distributed data files. In other examples, distributed data files may include text data, image data, audio data, etc., whereby each distributed data file may be characterized to determine one or more classifications of text, image, or audio attributes. In some cases, text of an electronic document or data file may classified in accordance with a "topic" attribute (or any other attribute), as well as other feature data including image data and audio data, to identify event data. Each of state classifiers 344a to 344n may be configured to generate data representing characterized attribute data, such as event state data 319, which may be transmitted to data compatibility controller 348.

Data compatibility controller 348 is shown to include a data compatibility analyzer 348a and a compatible data integrator 348b. Data compatibility analyzer 348a may include logic configured to receive temporal event data 305 and event state data 319, and the logic may be further configured to access compatibility rule model data 332. Compatibility rule model data 332 may include data and rules with which data compatibility analyzer 348a can analyze event state data 319 associated with distributed data files to determine compatible data with which to integrate one or more subsets of data in distributed data sources 103 of FIG. 1. Compatible data integrator 348b may be configured to identify distributed data files 354 and 364 that may include compatible data 355 and 365, respectively, responsive to data signals from data compatibility analyzer 348a specifying compatible data. Further to this example, compatible data integrator 348b may identify content 351, 361, and 371 of respective data files 350, 360, and 370 as including incompatible executable instructions and/or content. In some examples, compatible data integrator 348b may be configured to identify APIs through which, or with which, integration data 356 and 366 may be guided through a cross-stream API selector 349 to transmit integration data 356 and 366 via a message throughput data pipe 330 for integration with compatible data 355 and 366, respectively.

In view of the foregoing, structures and/or functionalities depicted in FIG. 3 as well as other figures herein, may be implemented as software, applications, executable code, application programming interfaces ("APIs"), processors, hardware, firmware, circuitry, or any combination thereof.

Figure 4:
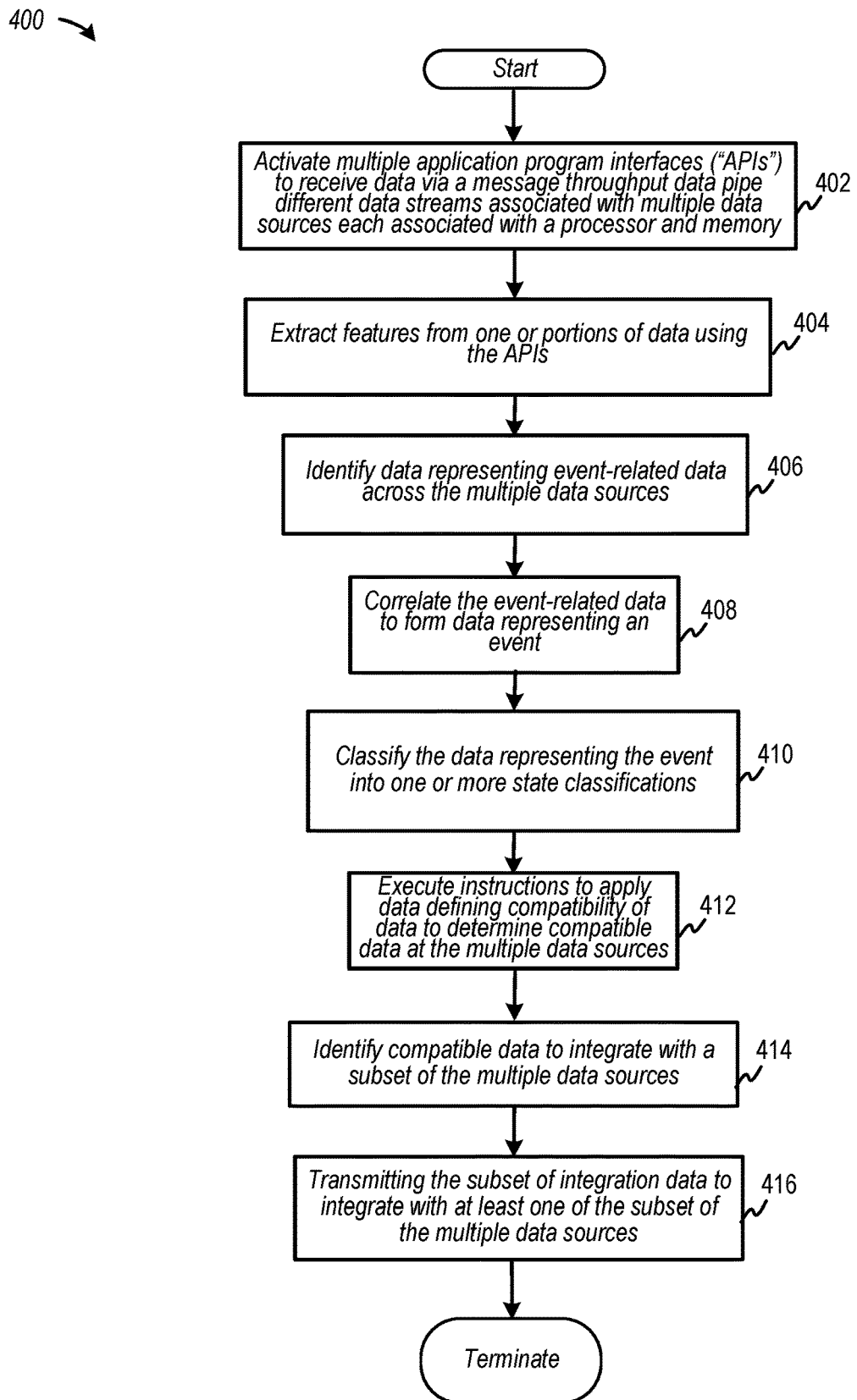
FIG. 4 is a flow diagram depicting an example of automatically updating or modifying one or more compatible distributed data files across multiple data streams based on event data, according to some embodiments.

FIG. 4 is a flow diagram depicting an example of automatically updating or modifying one or more compatible distributed data files across multiple data streams based on event data, according to some embodiments. Flow 400 may be an example of implementing a cross-stream data processor in accordance with various examples described herein. At 402, multiple application program interfaces ("APIs") may be activated to receive different data streams via a "message throughput data pipe," the different data streams being associated with multiple data sources. Examples of each of the multiple sources, such as hosted user-generated video content, may include computing devices having a processor and memory to generate and host executable instructions and/or content. In some cases, the message throughput data pipe may be configured to implement electronic messaging in accordance with a publish-subscribe data messaging architecture to form a "message throughput data pipe."

At 404, features from one or portions of data may be extracted using, for example, APIs subsequent to initiating the extraction of data. Initiation of the extraction of data may be caused by user input into a computing device or may be automatically performed in response to an application. At 406, data representing event-related data across multiple data sources may be identified based on, for example, extracted feature data. At 408, event-related data may be correlated among various multiple data sources to form data representing an "event." That is, correlated event-related data may identify an event as being indicative of dynamic changes in states of multiple pieces of code (or executable instructions), or indicative of dynamic changes in content reflective of changes to an environment (e.g., technical environments, geographic environments, social environments, political environments, retail and merchant environments, etc.).

In some examples, extraction of feature data may include analyzing data representing one or more of executable instructions, text, video, and/or audio to derive event-related data, and correlating event-related data to identify, for example, one or more text terms or tokens representing an event. In at least one example, extraction of features may include executing instructions to create word vectors disposed in a vector space, and calculating degrees of similarity among word vectors to predict contextual terms to identify one or more text terms associated with an event. According to various examples, natural language processing techniques may be used to calculate similar text terms that may be associated together to represent event data. In one example, an algorithm implementing cosine similarity may be used in neural networks to determine similar units of text and/or context that may be used to identify event data (e.g., in machine learning algorithms, deep learning algorithms, and other natural language algorithmic functions).

At 410, data associated with an event may be classified into one or more state classifications to indicate, for example, at least a degree of compatibility of target data files to receive data for integration. In some examples, supplemental data (e.g., metadata) may be classified to determine one or more states of the supplemental data, which may be used to identify an event and/or classification of data files (e.g., text documents) to determine compatibility. At 412, instructions to apply data defining compatibility of data may be executed to determine compatible data at multiple data sources. At 414, compatible data may be identified for integration with a subset of multiple data sources. At 416, a subset of integration data may be transmitted via a messaging service to integrate with at least subset of multiple data sources.

In some examples, a cross-stream data processor may be configured to determine whether event data may change temporally. For example, a cross-stream data processor may be configured to detect a value representing an event over time to determine an amount of diffusivity of the event among the multiple data sources. In response to the amount of diffusivity, another event may be determine. Further, a cross-stream data processor may be configured to extract other features from one or more other portions of data using APIs to identify data representing other event-related data across multiple data sources. The other event-related data may be correlated with similar event data to form data representing another event, whereby a subsequent event may cause modification of data files via subsequent integration of data.

Figure 5:
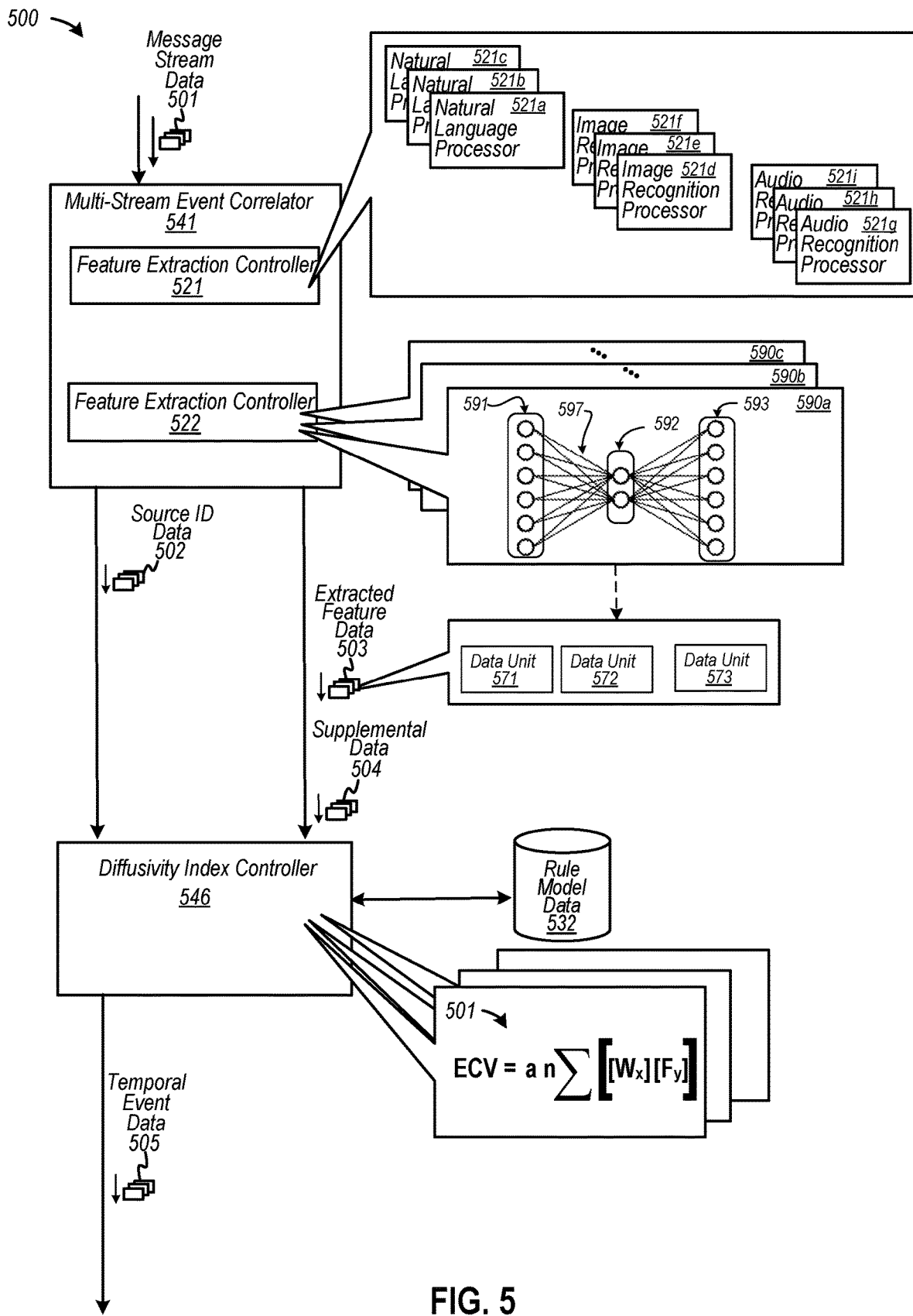
FIGS. 5 and 6 are diagrams depicting functional block diagrams of another example of a cross-stream data processor, according to some embodiments.
Figure 6:
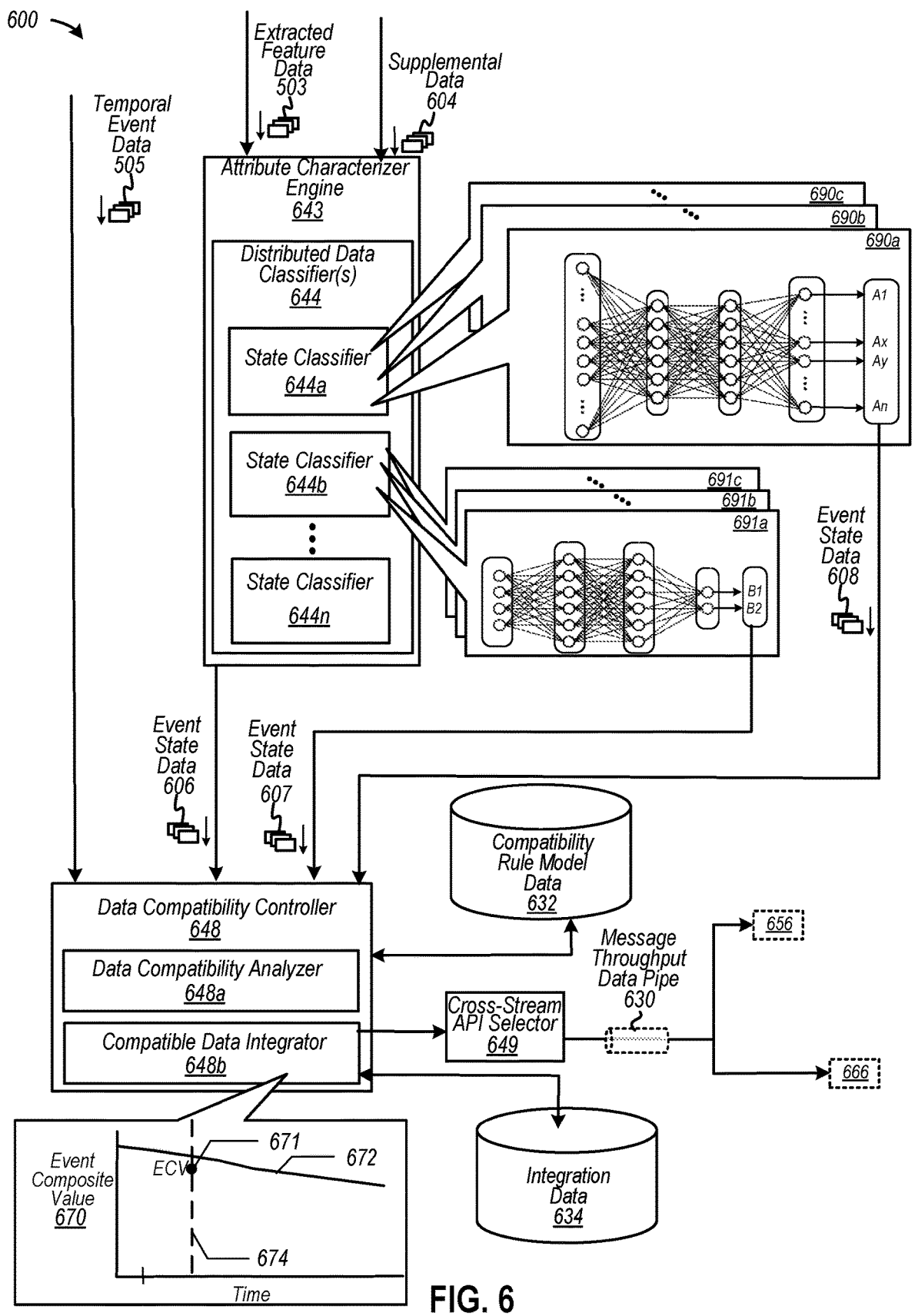

FIGS. 5 and 6 are diagrams depicting functional block diagrams of another example of a cross-stream data processor, according to some embodiments. Diagram 500 of FIG. 5 depicts a portion of a cross-stream data processor that includes a multi-stream event correlator 541 and a diffusivity index controller 546. Multi-stream event correlator 541 is shown to include any number of feature extraction controllers configured to extract features from message data or data associated with distributed data files. Examples of feature extraction controllers include feature extraction controllers 521 and 522. Diagram 600 of FIG. 6 depicts another portion of a cross-stream data processor that includes an attribute characterizer engine 643 and a data compatibility controller 648. Attribute characterizer engine 643 is shown to include distributed data classifiers 644, which may include any number of state classifiers 644a to 644n. Data compatibility controller 648 is shown to include a data compatibility analyzer 648a and a compatible data integrator 648b. Further to diagram 600, data compatibility controller 648 may be coupled to a data repository, such as compatibility rule model data 632. Note that elements depicted in diagram 500 of FIG. 5 and diagram 600 of FIG. 6 may include structures and/or functions as similarly-named or similarly-numbered elements depicted in other drawings.

Referring to FIG. 5, multi-stream event correlator 541 may include logic configured to receive and process message stream data 501, which may include electronic message data (e.g., published-subscribe messages) from any number of distributed data sources, such as computing platforms supporting YouTube® video content, Twitter® text content, and any other source of data, whereby electronic message data may include content data (or portions thereof) and/or supplemental data (e.g., metadata) regarding the same.

Feature extraction controllers 521 and 522 may include any number of feature extraction processes to, for example, extract feature data to analyze content data and supplemental data. Feature extraction controllers 521 and 522 may be further configured to generate a number of feature vectors to perform pattern recognition, predictive or probabilistic data analysis, machine learning, deep learning, or any other algorithm (e.g., heuristic-based algorithms) to identify at least a subset of features that may constitute an event (as derived from data from various data sources).

In the example shown, feature extraction controller 521 may include any number of natural language processor algorithms 521a to 521c, any number of image recognition processor algorithms 521d to 521f, any number of audio recognition processor algorithms 521g to 521i, or any other set of algorithms. Examples of natural language processor algorithms 521a to 521c may include algorithms to tokenize sentences and words, perform word stemming, filter out stop or irrelevant words, or implement any other natural language processing operation to determine text-related features. Image recognition processor algorithms 521d to 521f may be configured to perform character recognition, facial recognition, or implement any computer vision-related operation to determine image-related features. Audio recognition processor algorithms 521g to 521i may be configured to perform speech recognition, sound recognition, or implement any audio-related operation to determine audio-related features.

Feature extraction controller 522 may include any number of predictive data modeling algorithms 590a to 590c that may be configured to perform pattern recognition and probabilistic data computations. For example, predictive data modeling algorithms 590a to 590c may apply "k-means clustering," or any other clustering data identification techniques to form clustered sets of data that may be analyzed to determine or learn optimal classifications of event data and associated outputs and supplemental data related thereto. In some examples, feature extraction controller 522 maybe configured to detect patterns or classifications among datasets through the use of Bayesian networks, clustering analysis, as well as other known machine learning techniques or deep-learning techniques (e.g., including any known artificial intelligence techniques, or any of k-NN algorithms, linear support vector machine ("SVM") algorithm, regression and variants thereof (e.g., linear regression, non-linear regression, etc.), Bayesian inferences and the like, including classification algorithms, such as Naïve Bayes classifiers, or any other statistical, empirical, or heuristic technique). In other examples, predictive data modeling algorithms 590a to 590c may include any algorithm configured to extract features and/or attributes based on classifying data or identifying patterns of data, as well as any other process to characterize subsets of data.

In the example shown, feature extraction controller 522 may be configured to implement any number of statistical analytic programs, machine-learning applications, deep-learning applications, and the like. Feature extraction controller 522 is shown to have access to any number of predictive models, such as predictive model 590a, 590b, and 590c, among others. As shown, predictive data model 590a may be configured to implement one of any type of neuronal networks to predict an action or disposition of an electronic message, or any output representing an extracted feature for determining either an event or supplemental data to determine compatibility, or both. A neural network model 590a includes a set of inputs 591 and any number of "hidden" or intermediate computational nodes 592, whereby one or more weights 597 may be implemented and adjusted (e.g., in response to training). Also shown, is a set of predicted outputs 593, such as text terms defining an event, among any other types of outputs.

Feature extraction controller 522 may include a neural network data model configured to predict (e.g., extract) contextual or related text terms based on generation of vectors (e.g., word vectors) with which to determine degrees of similarity (e.g., magnitudes of cosine similarity) to, for example, establish contextual compatibility, at least in some examples. Output data 593 as contextual or related text terms may be used to identify event data (e.g., an event). In at least one example, feature extraction controller 522 may be configured to implement a "word2vec" natural language processing algorithm or any other natural language process that may or may not transform, for example, text data into numerical data (e.g., data representing a vector space). According to various other examples, feature extraction controller 522 may be configured to implement any natural language processing algorithm.

In view of the foregoing, multi-stream event correlator 541 may be configured to implement various feature extraction functions to extract features that may be correlated to identify one or more groups of data units 571 to 573 as extracted feature data 503, whereby each group of data units 571 to 573 may be associated with an event. For example, data unit 571 may represent extracted text term "YouTube," data unit 572 may represent extracted text term "API," and data unit 573 may represent extracted text term "Update," whereby data units 571 to 573 may correlate to an event in which a major software update or revision may affect a prominent number of distributed data files that implement such an API. As another example, data unit 571 may represent extracted text term "COVID," data unit 572 may represent extracted text term "Vaccine," and data unit 573 may represent extracted text term "Death," whereby data units 571 to 573 may correlate to an event in which various distributed data files updates to content that may describe recent death rates due to COVID-19 vaccines.

Diffusivity index controller 546 may be configured to receive extracted feature data 503 and supplemental data 504, as well as source ID data 502 that identifies distributed data sources from which feature data may be extracted. Output data from feature extraction controllers 521 and 522, as well as output data from multi-stream event correlator 541, may be used to either identify an event or provide contextual data, or both, to identify the event and compatibility of the distributed data sources to receive integrated data.

As shown, diffusivity index controller 546 may be coupled to a data repository 532 that may include rule model data to determine one or more events, according to at least one example. For instance, rule model data 532 may include values of weighting factors to be applied to values of extracted features to compute an event composite value representative of an event. In a non-limiting example, an event composite value ("ECV") may be computed in accordance with relationship 501 in which a value of extracted feature ("Fy") may be adjusted by a value represented by a weighting factor value ("Wx"). An aggregation (e.g., a summation) of each weighted feature value may be used to identify an event. In some cases, an aggregated event composite value may be optionally normalized by application of a normalization factor or function ("nx"), according to some examples. A correction factor "a" may be applied to resolve errors or to fine-tune the result. Again, relationship 501 is an example of one of any number implementations that may be applied by diffusivity index controller 546 to identify "diffusive," or viral events. Returning to the above example, an event composite value for an event defined by terms "YouTube+API+Update" may be greater than an event composite value for an event defined by terms "COVID+Vaccine+Death," and, as such, may be representative of a more prominent or diffusive (e.g., viral) event. Diffusivity index controller 546 may transmit temporal event data 505 to attribute characterizer engine 643 and data compatibility controller 648, both of FIG. 6, whereby temporal event data 505 may include event composite values, extracted feature data, supplemental data, any other data output, and/or any other data receive from distributed data sources.

Referring to FIG. 6, attribute characterizer 643 is configured receive extracted feature data 503 of FIG. 5 and supplemental data 604, which may include queried data from multiple streams of electronic messages. In various examples, attribute characterizer engine 643 may be configured to characterize distributed data files and content to determine whether those distributed data files and content are compatible with data integration. Referring again to the above example, consider that attribute characterizer engine 643 may be configured to classify various states of distributed data sources to determine data integrations related to an event defined by COVID+Vaccine+Death terms are neither compatible nor suitable with data sources (e.g., API code) for which updates to APIs have been applied for a YouTube video platform (i.e., data integrations related to COVID-19 may relate to a different, unrelated event than that defined by YouTube+API+Update terms).

In the example shown, state classifier 644*a* and 644*b* may be configured to implement any number of statistical analytic programs, machine-learning applications, deep-learning applications, and the like. State classifier 644*a* may include any number of predictive models, such as predictive models 690*a*, 690*b*, and 690*c*, and state classifier 644*b* may include one or more predictive models, such as predictive models 691*a*, 691*b*, and 691*c*. Predictive models 690 and 691 may be implemented similar to, or equivalent to, predictive models described in FIG. 5. In the example shown, state classifier 644*a* may receive inputs of any combination of extracted feature data 503 and supplemental data 604 to compute event state data 608. For example, inputs to state classifier 644*a* may determine event state data 608 indicates that data source relates to either a specific "programming language" of distributed data file (e.g., Java, Python, etc.) or a spoken language (e.g., English, Mandarin, Farsi, etc.). As another example, inputs into state classifier 644*b* may determine event state data 607 that indicates one of a positive state, a neutral state, or a negative state (e.g., based on sentiment analysis relative to content of data source). Other state classifiers, such as state classifier 644*n*, may generate other event state data 606 characterizing a distributed data file for subsequent evaluation as to the compatibility of integrating data.

Data compatibility controller 648 may be configured to receive temporal event data 505 to identify event data, and may be further configured to receive event state data 606 to 608 to characterize compatibility of integrating one or more subsets of data. Also, data compatibility controller 648 may be coupled to compatibility rule model data 632, which may include data representing various rules and models with which to determine compatibility of integrating data, such as integration data 634, based on temporal event data 505 and event state data 606 to 608. Integration data 634 may include data representing executable instructions in view of an event (e.g., a code update to revised distributed software or applications), or may include data representing content (e.g., an update to content responsive to a prominent event in any environment). For example, integration data 634 directed to COBOL may not be compatible to data sources implementing Python or other programming languages. As another example, integration data 634 directed to content relating to firearms or adult content may not be compatible to data sources that include content directed to children.

Data compatibility analyzer 648*a* may be configured to identify subsets of integration data 634 that may be compatible with a subset of data sources. Compatible data integrator 648*b* may be configured to transmit compatible integration data 656 and 666 to targeted data sources via message throughput data pipe 630, as selected by a cross-stream API selector 649. Compatible data integrator 648*b* may also be configured to monitor an influence of an event over time, whereby the influence of the event may be depicted as an event composite value 670. For example, compatible data integrator 648*b* may monitor event composite value 670 to detect a specific event composite value ("ECV") 671 at time 674. As shown, ECV 671 may have decreased (e.g., became less diffusive or prominent) over time, and another event having event composite values 672 may be greater. In this case, compatible data integrator 648*b* may also be configured to modify the implementation of integration data 656 and 666 based on, for example, decreased relevancy.

In view of the foregoing, structures and/or functionalities depicted in FIGS. 5 and 6 as well as other figures herein, may be implemented as software, applications, executable code, application programming interfaces ("APIs"), processors, hardware, firmware, circuitry, or any combination thereof.

Figure 7:
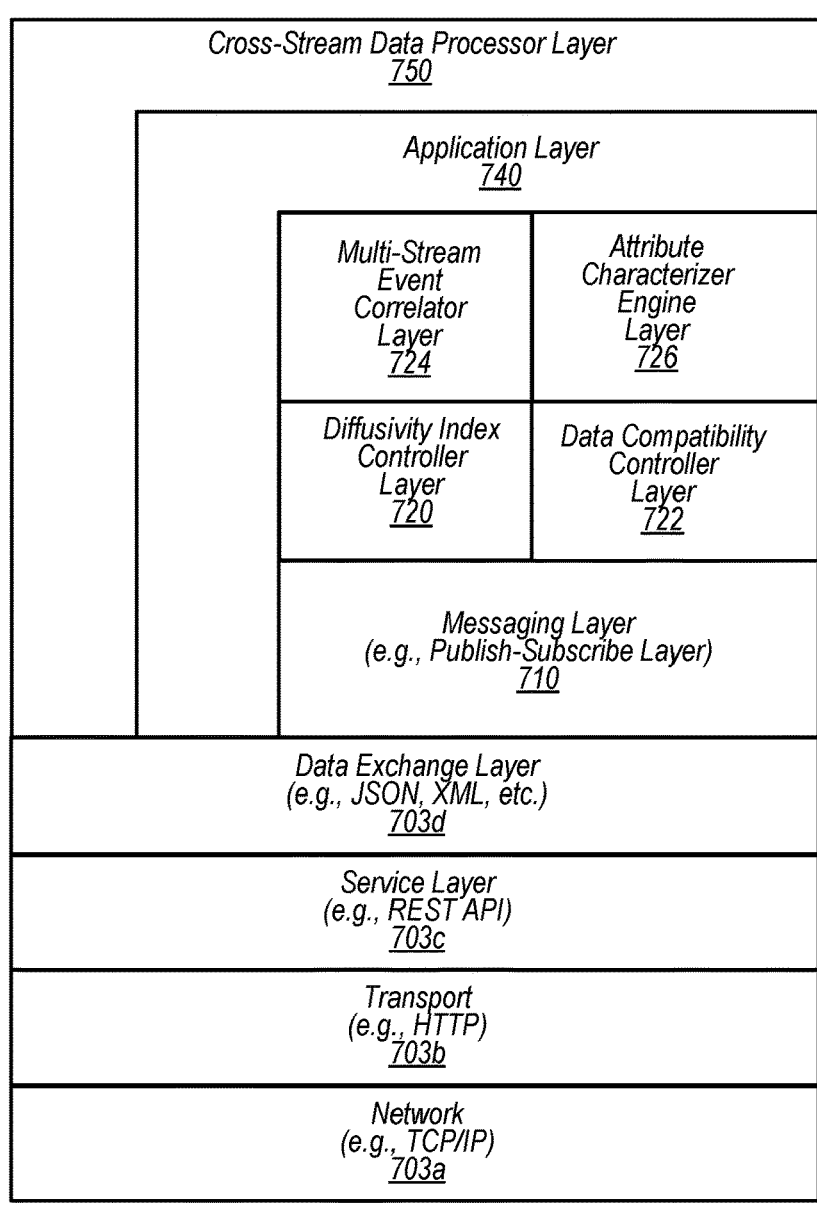
FIG. 7 illustrates an exemplary layered architecture for implementing a cross-stream data processor application, according to some examples.

FIG. 7 illustrates an exemplary layered architecture for implementing a cross-stream data processor application, according to some examples. Diagram 700 depicts application stack ("stack") 701, which is neither a comprehensive nor a fully inclusive layered architecture for detecting changes in event data in distributed data files, and in response, automatically updating or modifying one or more compatible distributed data files. One or more elements depicted in diagram 700 of FIG. 7 may include structures and/or functions as similarly-named or similarly-numbered elements depicted in other drawings, or as otherwise described herein, in accordance with one or more examples, such as described relative to FIGS. 1-3 or any other figure or description herein.

Application stack 701 may include a cross-stream data processor layer 750 upon application layer 740, which, in turn, may be disposed upon any number of lower layers (e.g., layers 703*a* to 703*d*). Cross-stream data processor layer 750 may be configured to provide functionality and/or structure to implement a cross-stream data processor application, as described herein. Further, cross-stream data processor layer 750 and application layer 740 may be disposed on data exchange layer 703*d*, which may implemented using any programming language, such as HTML, JSON, XML, etc., or any other format to effect generation and communication of requests and responses among computing devices and computational resources constituting an enterprise or an entity and a planning application and/or platform configured to disseminate information expeditiously, such as information regarding products or services aligned with data in targeted data sources compatible with data integration. Data exchange layer 703*d* may be disposed on a service layer 703*c*, which may provide a transfer protocol or architecture for exchanging data among networked applications.

For example, service layer 703c may provide for a RESTful-compliant architecture and attendant web services to facilitate GET, PUT, POST, DELETE, and other methods or operations. In other examples, service layer 703c may provide, as an example, SOAP web services based on remote procedure calls ("RPCs"), or any other like services or protocols (e.g., APIs). Service layer 703c may be disposed on a transport layer 703b, which may include protocols to provide host-to-host communications for applications via an HTTP or HTTPS protocol, in at least this example. Transport layer 303b may be disposed on a network layer 703a, which, in at least this example, may include TCP/IP protocols and the like.

As shown, cross-stream data processor layer 750 may include (or may be layered upon) an application layer 740 that includes logic constituting a multi-stream event correlator layer 724, a diffusivity index controller layer 720, an attribute characterizer engine layer 726, a data compatibility controller layer 722, and a messaging layer 710. In various examples, layers 720, 722, 724, and 726 may include logic to implement the various functionalities described herein. Messaging layer 710 may include logic to facilitate publish-subscribe messaging services, such as provided by a Google® Cloud Pub/Sub messaging architecture.

Any of the described layers of FIG. 7 or any other processes described herein in relation to other figures may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including, but not limited to, Python™, ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc., as well as any proprietary application and software provided or developed by Sightly Enterprises, Inc., or the like. The above-described techniques may be varied and are not limited to the embodiments, examples or descriptions provided.

Figure 8:
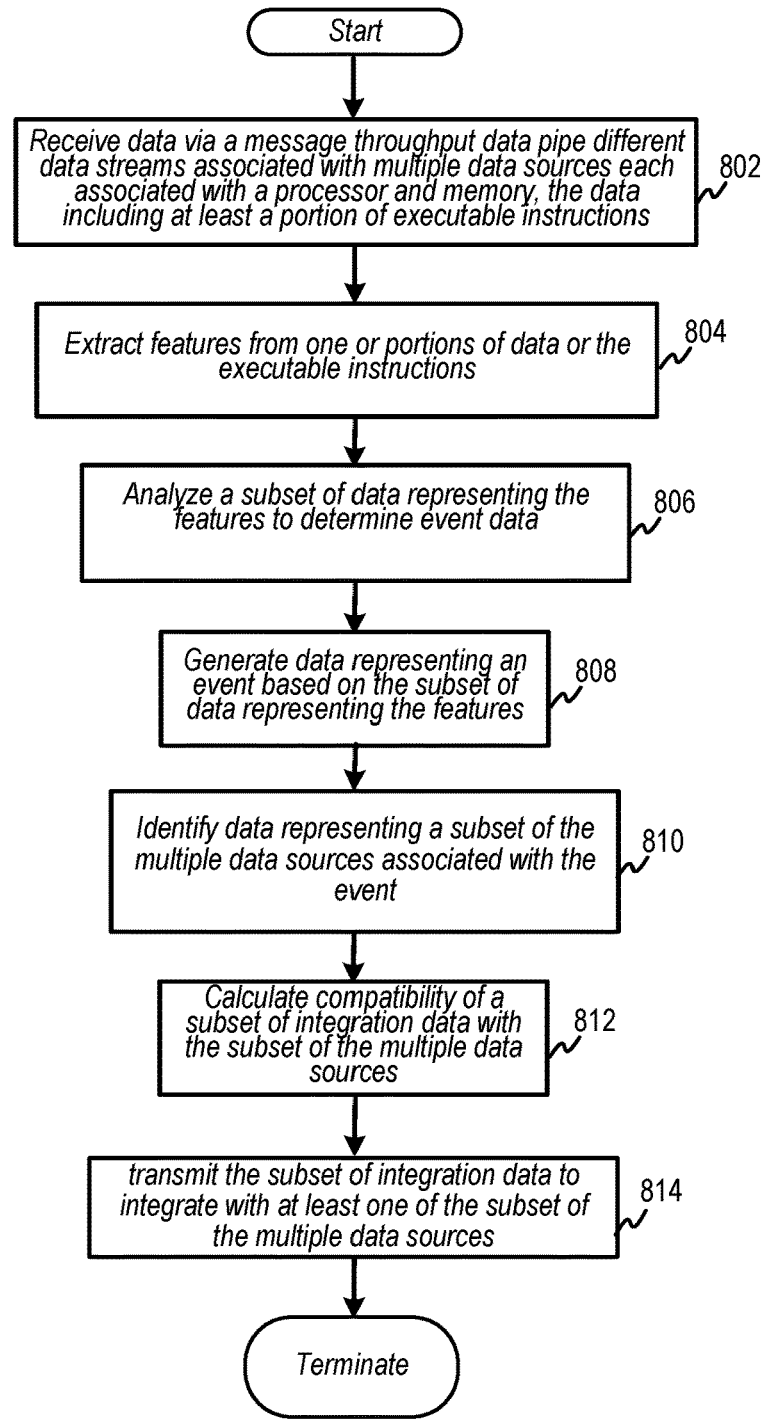
FIG. 8 is a flow diagram as an example of correlating event data across multiple data streams to identify compatible distributed data files with which to integrate data, according to some embodiments.

FIG. 8 is a flow diagram as an example of correlating event data across multiple data streams to identify compatible distributed data files with which to integrate data, according to some embodiments. Flow 800 is another example of implementing a cross-stream data processor in accordance with various examples described herein. At 802, different data streams may be received via a message throughput data pipe, the different data streams being associated with multiple data sources.

At 804, features may be extracted from one or portions of data, such as content data and/or the executable instructions, any which may be disposed at any number of distributed data sources. At 806, a subset of data representing extracted features may be analyzed to determine event data. In some examples, electronic messages, which include subsets of the extracted features, may be batched to form batched electronic messages. The batched electronic messages may be stored temporarily in, for example, cloud storage for query and analysis. Further, extracted features may be determined by executing instructions to implement one or more natural language processors to determine event data based on the extracted features. In at least one example, at least one natural language processor maybe configured to filter text terms and apply a predictive or machine learning algorithm to generate vectors to identify text terms. Further, the natural language processor may be configured to calculate data representing degrees of similarity among the vectors to identify event data, based on the vectors identifying the text terms. In some implementations, similar text terms and context may be used to define an event.

At 808, data representing an event may be generated based on the subset of data representing the extracted features. At 810, data representing a subset of multiple data sources associated with an event can be identified. In some examples, an event may be identified based on supplemental data as event indicators, which may be received into a diffusivity index controller. The diffusivity index controller may be configured to classify event data based on the supplemental data to characterize a rate of diffusivity among different data streams to, for example, identify a prominent or prioritized event (e.g., an event associated with a greater amount of diffusivity or virality). According to some examples, a rate of diffusivity may refer to a rate of propagation of event-related data across multiple data sources during an interval of time, the rate of propagation being determined, at least in part, by extracting an amount of feature data associated with an event within a time interval. In some examples, supplemental data may include metadata in different data formats, each data format being associated with each of the multiple data sources. Alternatively, supplemental data may also include one or more of time range-related data, location-related data, and quantity-related data, each of which may be implemented to detect event data in one or more of the subset of multiple data sources.

At 812, compatibility of a subset of integration data can be calculated to optimize integration of data with a subset of compatible data sources. For example, compatibility may be computed to classify a subset of multiple data sources to identify one or more states defining attributes of compatibility. Subsequently, a processor may be configured to automatically select sets of integration data based on attributes of compatibility (e.g., relative to distributed data files). At 814, a subset of compatible integration data may be transmitted for integration into at least one subset of multiple data sources. For example, a subset of compatible integration data may include brand-specific content (e.g., video or text) directed to age-appropriate content (e.g., teddy bears) that may integrate within a data source that promotes children toys.

Figure 9:
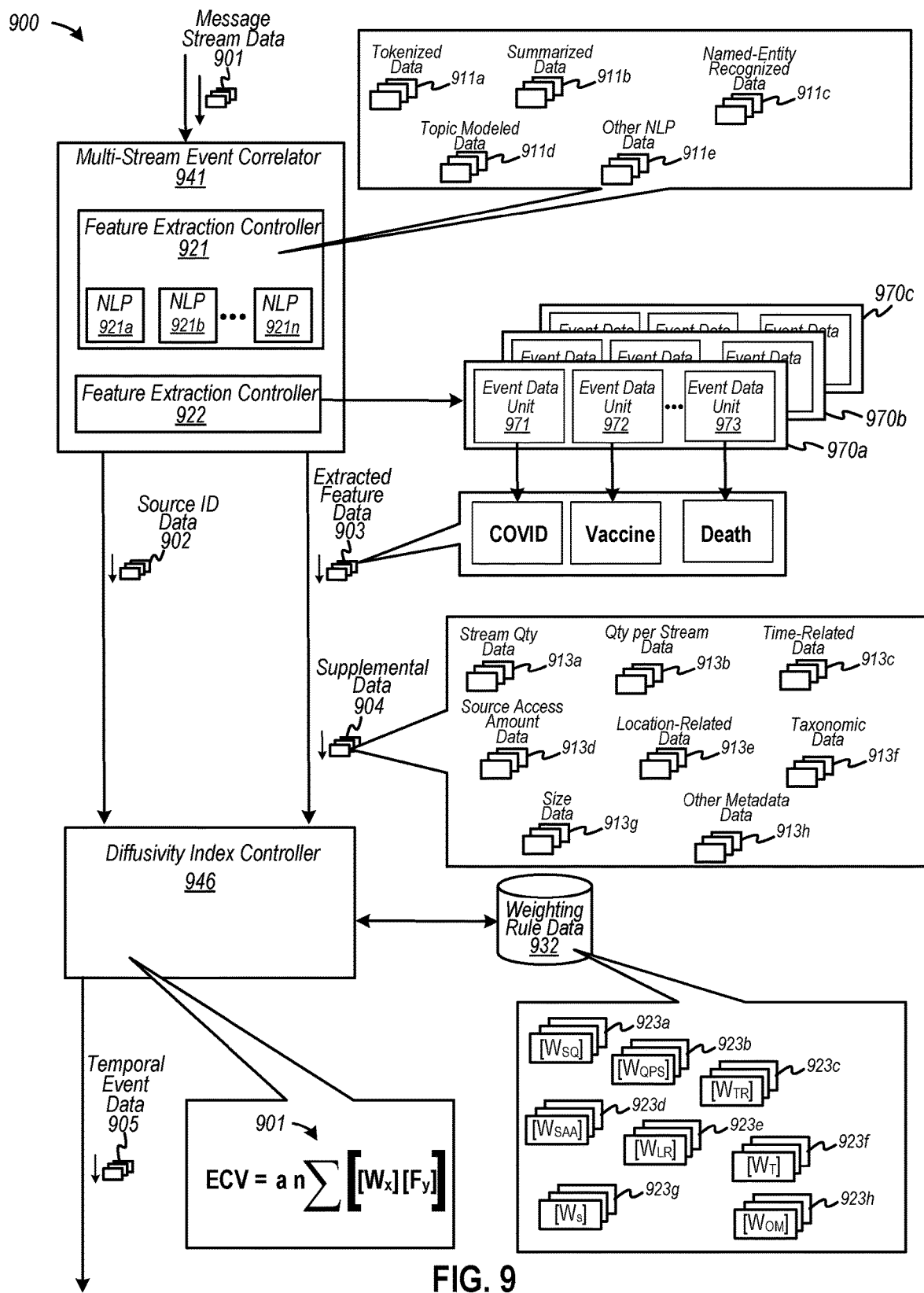
FIGS. 9 and 10 are diagrams depicting functional block diagrams of a specific example of a cross-stream data processor, according to some embodiments.
Figure 10:
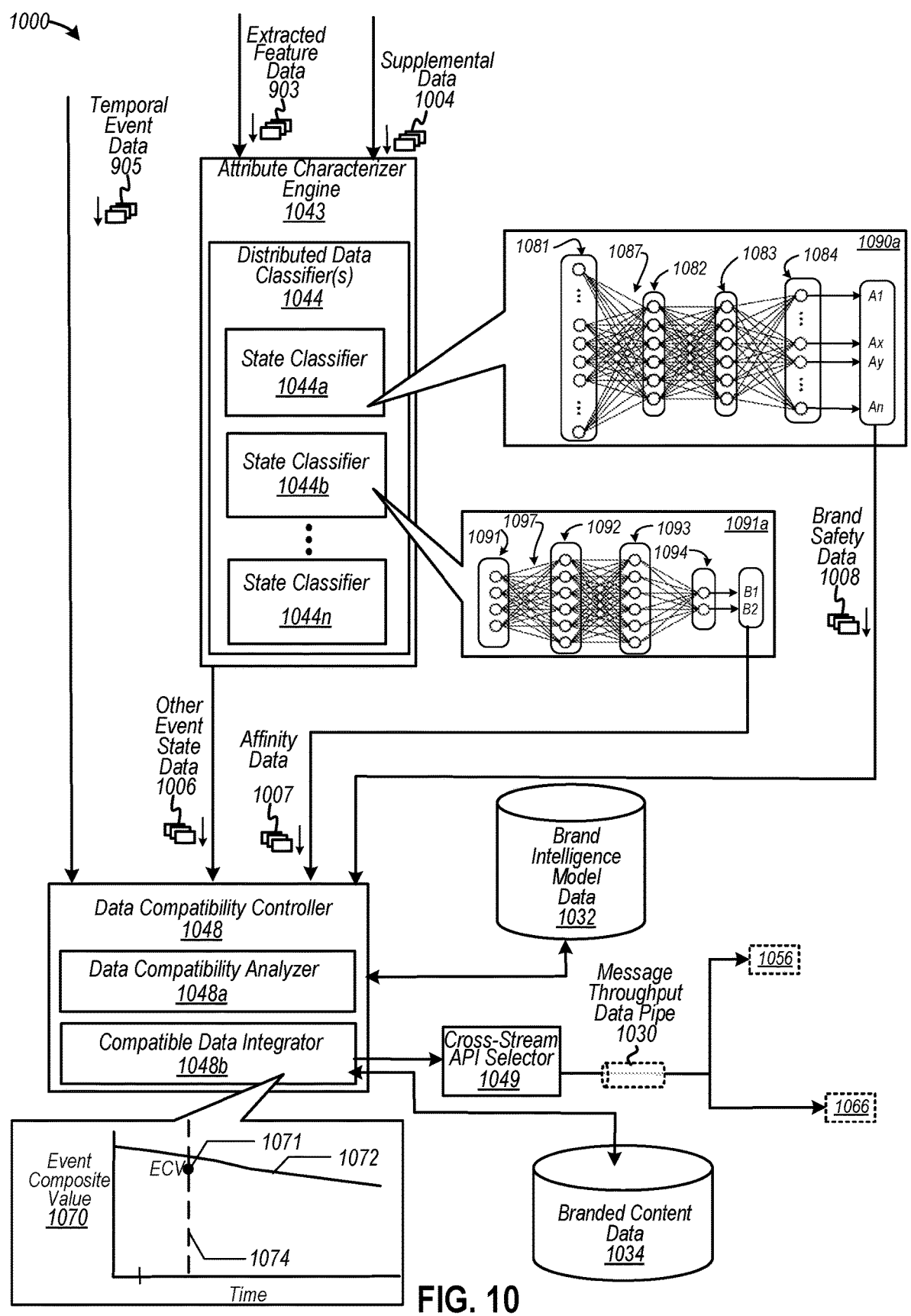

FIGS. 9 and 10 are diagrams depicting functional block diagrams of a specific example of a cross-stream data processor, according to some embodiments. Diagram 900 of FIG. 9 depicts a portion of a cross-stream data processor that includes a multi-stream event correlator 941 and a diffusivity index controller 946. Multi-stream event correlator 941 is shown to include any number of feature extraction controllers configured to extract features from message data or data associated with distributed data files. Examples of feature extraction controllers include feature extraction controllers 921 and 922. Diagram 1000 of FIG. 10 depicts another portion of a cross-stream data processor that includes an attribute characterizer engine 1043 and a data compatibility controller 1048. Attribute characterizer engine 1043 is shown to include distributed data classifiers 1044, which may include any number of state classifiers 1044a to 1044n. Data compatibility controller 1048 is shown to include a data compatibility analyzer 1048a and a compatible data integrator 1048b. Further to diagram 1000, data compatibility controller 1048 may be coupled to a data repository, such as a brand intelligence model data 1032. In some examples, brand intelligence model data 1032 may include "Brand Mentality®" data, as provided by Sightly Enterprises, Inc. Note that elements depicted in diagram 900 of FIG. 9 and diagram 1000 of FIG. 10 may include structures and/or functions as similarly-named or similarly-numbered elements depicted in other drawings.

In the examples of FIGS. 9 and 10, a computing and data platform may be configured to implement logic to analyze data associated with multiple different data sources to determine one or more events during a range of time. Based on an event (or a type of an event), overall data traffic driven to access multiple different data sources may increase expeditiously as correlated event data propagates across multiple data sources. The multiple different data sources may provide for integration of data, such as inclusion of data representing information about a product or service. A cross-stream data processor may be configured to integrate data representing branded content directed to a product or service into a data source that may be compatible with the branded content data. Further, a subset of compatible integration data may also include intra-brand content data, which may include data representing different products or services associated with a brand. The intra-brand content data may include data representing different compatibility requirements based on different profiles associated with a common brand. As prominence and diffusivity of events and content of various data sources dynamically change over time, a cross-stream data processor, as described herein, may be configured to optimize accesses to integrated or branded content (e.g., maximized outcomes for branding information) at optimal data sources (e.g., data integrations aligned with requirements of branded content that aim to preserve brand reputation and loyalty).

Referring to FIG. 9, multi-stream event correlator 941 may include logic configured to receive and process message stream data 901, which may include electronic message data from any number of distributed data sources, such as computing platform supporting YouTube® video content, Twitter® text content, and any other source of data, whereby electronic message data may include content data (or portions thereof) and/or supplemental data (e.g., metadata) regarding same.

Feature extraction controllers 921 and 922 may include any number of feature extraction processes to, for example, extract feature data to analyze content data and supplemental data. As described herein, feature extraction controllers 921 and 922 may be further configured to generate a number of feature vectors to perform pattern recognition, predictive or probabilistic data analysis, machine learning, deep learning, or any other algorithm (e.g., heuristic-based algorithms) to identify at least a subset of features that may constitute an event as derived from data from various data sources.

In the example shown, feature extraction controller 921 may include any number of natural language processor algorithms 921a to 921n, any of which may be configured to generate natural language processing-related data, such as tokenized data 911a, summarized data 911b, name-entity recognized data 911c, topic-modeled data 911d, and other natural language processing data 911e. Feature extraction controller 922 may include any number of predictive data modeling algorithms to compute groups of event data 970a, 970b, and 970c for corresponding intervals of time. For example, feature extraction controller 922 may determine that event data units 971, 972, and 973 correspond to respective terms "COVID," "Vaccine," and "Death," which may be transmitted to diffusivity index controller 946 as extracted feature data 903. Source identification data 902, which is associated with extracted feature data 903, may also be transmitted to diffusivity index controller 946.

Multi-stream event correlator 941 may also generate and/or transmit supplemental data 904, which may include derived data or data extracted from metadata. In this example, supplemental data 904 includes data representing a quantity of data streams correlated with event data ("Stream Qty Data") 913a, a quantity of event instances detected in a stream of data ("Qty per Stream Data") 913b, time-related data 913c, an amount of times that a data source (e.g., a webpage or YouTube video) is accessed or viewed ("Source Access Amount Data") 913d, location-related data 913e, taxonomic data 913f (e.g., industry or other business classifications), size data 913g (e.g., data size of a distributed data file), and other metadata 913h, such as metadata indicating a specific language (e.g., German), among other types of metadata. Note that in some examples, supplement data 904 may include metadata generated by YouTube Data API, such as a 3rd Version thereof.

Diffusivity index controller 946 may be configured to receive extracted feature data 903 and supplemental data 904, as well as source ID data 902 that identifies distributed data sources from which feature data may be extracted. Output data from feature extraction controllers 921 and 922, as well as output data from multi-stream event correlator 941, may be used to either identify an event or provide contextual data, or both, to identify the event and compatibility of the distributed data sources to receive integrated data. As shown, diffusivity index controller 946 may be coupled to a data repository 932 that may include weighting factor rule data to determine one or more events, according to at least one example. Data repository 932 may include weighting factor values 923a to 923h for application against data 913a to 913h, respectively. According to some examples, weighting factor values 923a to 923h may be customizable as a function of data provided via user inputs from user interfaces (not shown). In some cases, weighting factor values 923a to 923h may be customizable, automatically (by a processor), based on various other sources of data, as described herein.

In a non-limiting example, an event composite value ("ECV") may be computed in accordance with relationship 901 in which values of extracted feature data ("Fy"), such as data values 913a to 913h, may be adjusted by weighting factor values ("Wx") in weighting factor rule data repository 932. Diffusivity index controller 946 may be configured to transmit temporal event data 905 to attribute characterizer engine 1043 and data compatibility controller 1048, both of FIG. 10, whereby temporal event data 905 may include event composite values, extracted feature data, supplemental data, any other data output, and/or any other data receive from distributed data sources. In some examples, diffusivity index controller 946 may be configured to implement a virality index in accordance with proprietary software developed by Sightly Enterprises, Inc., of San Diego, California.

Referring to FIG. 10, attribute characterizer 1043 may be configured receive extracted feature data 903 of FIG. 9 and supplemental data 1004. In various examples, attribute characterizer engine 1043 may be configured to characterize data sources, such as YouTube videos and related content to determine whether target data sources are compatible with the integration of branded content. In the example shown, state classifier 1044a and 1044b may be configured to implement any number of statistical analytic programs, machine-learning applications, deep-learning applications, and the like. State classifier 1044a may include any number of predictive models, such as predictive model 1090a. In this example, predictive model 1090a may receive any input combination of extracted feature data 903 of FIG. 9 and supplemental data 1004 to generate brand safety output data 1008. For example, outputs A1, . . . , Ax, Ay, . . . An may generate brand safety output data 1008 indicative of one or more states of brand safety: military conflict, obscenity, drugs, tobacco, adult, firearms, crime, death/injury, online piracy, hate speech, terrorism, spam/harmful sites, and fake news, any of which may be used to classify distributed data source for compatibility of integrating branded content date. In at least some examples, brand safety output data 1008 may be indicative of one or more states of brand safety (and values thereof) in accordance with governing requirements set forth by the Global Alliance for Responsible Media ("GARM") as maintained by the World Federation of Advertisers ("WFA") of Brussels, Belgium. As another example, inputs into state classifier 1044b may cause predictive model 1091a to generate affinity data 1007 indicating sentiment state data, such as whether a distributed data file may be associated with a positive affinity state, a neutral affinity state, or a negative affinity state. In accordance with at least some examples, affinity data 1007 (e.g., sentiment state data or other like data) may include a range of data values that can include data values ranging from a maximal value of a positive affinity state to a maximal negative affinity state, the range including at least a subset of one or more data values representing a neutral affinity state. Thus, affinity data 1007 may include a range of affinity (e.g., sentiment values). Other state classifiers, such as state classifier 1044n, may generate other event state data 1006 characterizing a distributed data file for subsequent evaluation as to the compatibility of integrating data.

Data compatibility controller 1048 may be configured to receive temporal event data 905 to identify event data, and may be further configured to receive event state data 1006 to 1008 to characterize compatibility of integrating one or more subsets of branded content data. Also, data compatibility controller 1048 is coupled to brand intelligence model data 1032, which may include data representing various rules and models with which to determine compatibility of integrating data, such as branded content data 1034, based on temporal event data 905 and event state data 1006 to 1008. Branded content data 1034 may include data representing executable instructions to present branded content or may include data representing content (e.g., audio, text, video, etc.). As an example, branded content data 1034 directed to content relating to children toys may not be compatible for integration with data sources that depict videos of death, war, accidents, illnesses, or other age-inappropriate content.

Data compatibility analyzer 1048a may be configured to identify subsets of branded content data 1034 that may be compatible with a subset of data sources, such as a subset of YouTube channels. Compatible data integrator 1048b may be configured to transmit compatible branded content data 1056 and 1066 to targeted YouTube channels via message throughput data plate 1030, as selected by a cross-stream API selector 1049. Compatible data integrator 1048b may also be configured to monitor an influence of an event over time, whereby the influence of the event may be depicted as an event composite value 1070. For example, compatible data integrator 1048b may monitor event composite value 1070 to detect a specific event composite value ("ECV") 1071 at time 1074. As shown, ECV 1071 may decrease (e.g., become less diffusive or prominent) over time, and another event having event composite values 1072 may have a greater value. In this case, compatible data integrator 1048b may also be configured to modify the implementation of branded content data 1056 and 1066 based on, for example, decreased relevancy.

In view of the foregoing, structures and/or functionalities depicted in FIGS. 9 and 10 as well as other figures herein, may be implemented as software, applications, executable code, application programming interfaces ("APIs"), processors, hardware, firmware, circuitry, or any combination thereof.

Figure 11:
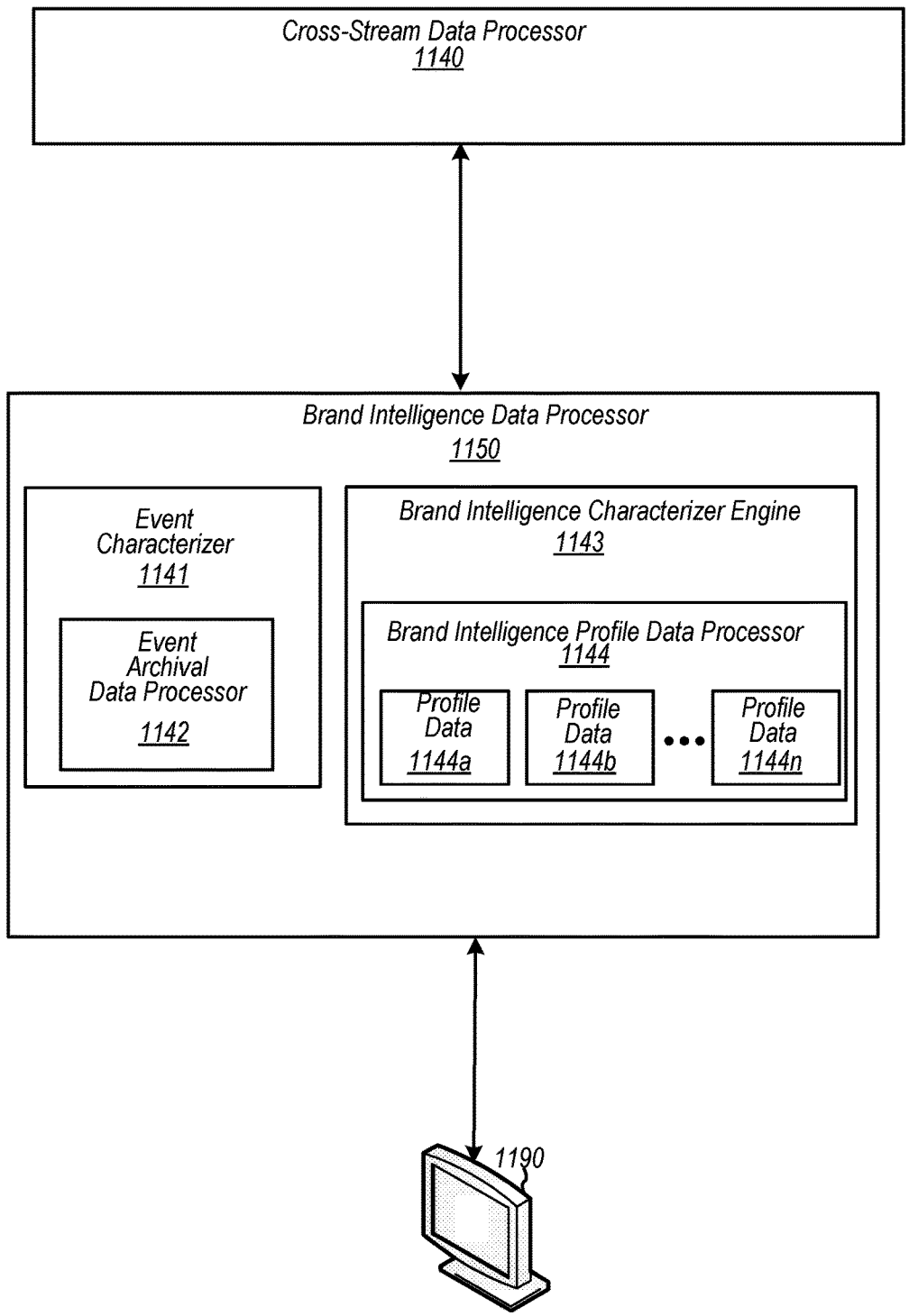
FIG. 11 includes an example of a brand intelligence data processor configured to characterize multiple data sources to determine compatibility with which to integrate data, according to some embodiments.

FIG. 11 includes an example of a brand intelligence data processor configured to characterize multiple data sources to determine compatibility with which to integrate data, according to some embodiments. Diagram 1100 includes a brand intelligence data processor 1150 coupled to a cross-stream data processor 1140 to receive and analyze, over multiple intervals of time, extracted event features. Example of extracted features include text-related features, video-related features, image-related features, audio-related features, and other feature data. Brand intelligence data processor 1150 may include an event characterizer 1141 and a brand intelligence characterizer engine 1143.

Event characterizer 1141 is shown to include an event archival data processor 1142. In some examples, event archival data processor 1142 may be configured to archive and store data describing event-related data for a particular data source (e.g., a particular YouTube channel). Brand intelligence characterizer engine 1143 is shown to include a brand intelligence profile data processor 1144 that is configured to monitor and archive the extracted features over time to determine contextual data in which an entity may be serving branded content in different data sources 1190. Further, brand intelligence characterizer engine 1143 may be further configured to generate predicted brand mentality profile data 1144a to 1144n, whereby predicted data profiles 1144a to 1144n may be implemented as a knowledge graph of compatible data sources that is determined a priori. As such, a particular entity may be able select a particular data profile 1144a to 1144n that defines compatible data sources at which server or present branded content while satisfying concerns regarding brand safety, brand reputation, and brand loyalty, among others.

Figure 12:
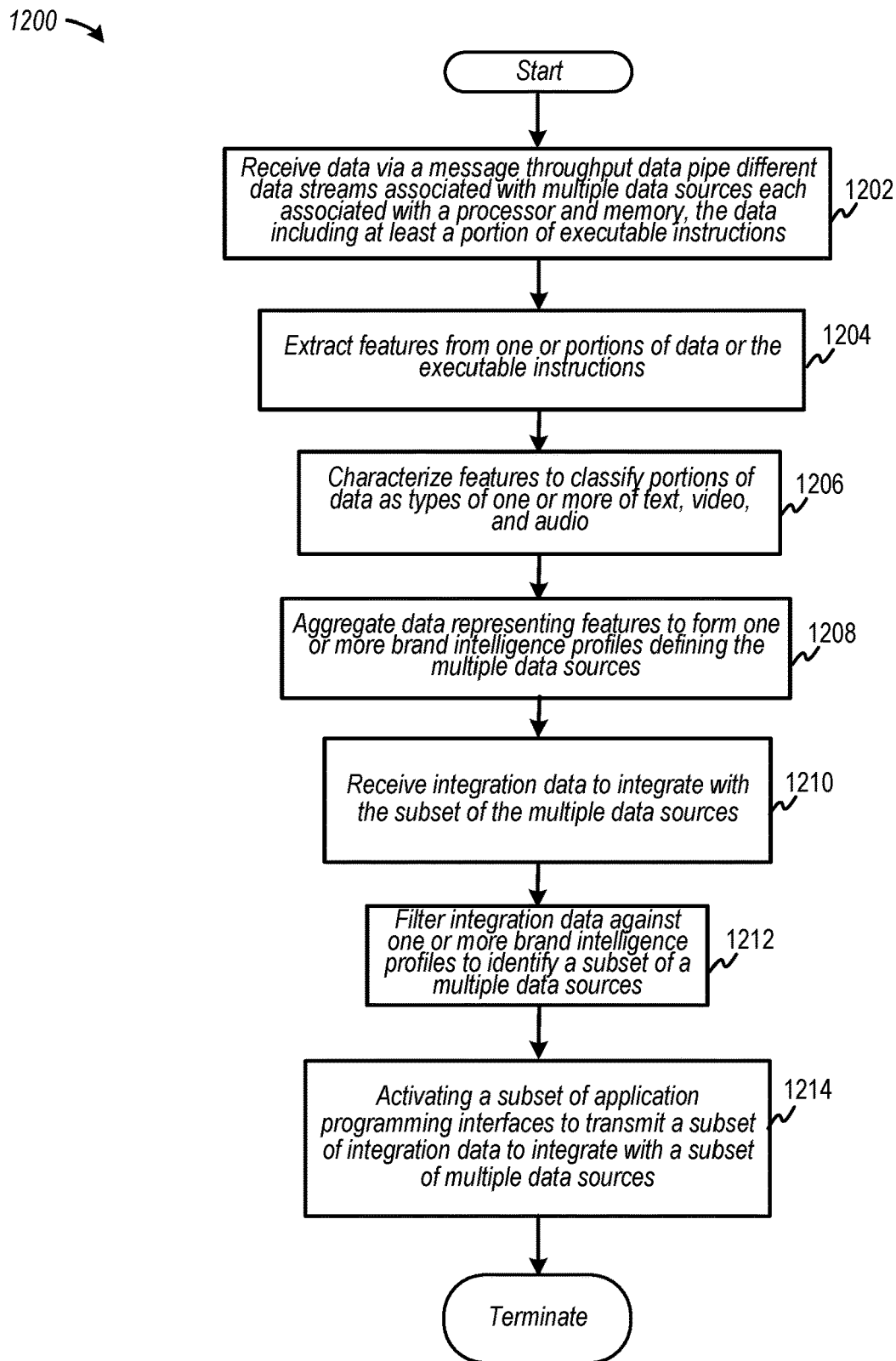
FIG. 12 is a flow diagram as an example of aggregating data to form brand intelligence profiles, according to some embodiments.

FIG. 12 is a flow diagram as an example of aggregating data to form brand intelligence profiles, according to some embodiments. Flow 1200 may begin at 1202, at which different data streams may be received via a message throughput data pipe associated with multiple data sources each associated with a processor and memory, the different data streams including at least a portion of executable instructions. At 1204, a number of features from one or portions of data (e.g., content data) or executable instructions may be extracted to form a number of extracted features. At 1206, extracted features may be characterized to classify portions of data as types of one or more of text, video, and audio. In some examples, extracted features may be correlated to form event data based on features extracted across different data streams. A rate of diffusivity associated with the event data may be computed to identify data files at a subset of multiple data sources based on the rate of diffusivity (note that the rate of diffusivity may broadly encompass and include a rate of virality). At 1208, data representing extracted features may be aggregated to form one or more brand intelligence profiles defining, for example, compatibility of multiple data sources to receive branded content for integration. In some examples, one or more of natural language processing algorithms to extract text, one or more image recognition processing algorithms to extract image data, and one or more audio recognition processing algorithms to extract audio data may be implemented. In one example, aggregation of extracted features may be performed automatically to, for example, generate a knowledge graph of brand-compatible content or data sources, based on the text data, the image data, and the audio data that identify multiple data sources. At 1210, integration data, such as branded content data, may be received from a repository to integrate with a subset of multiple data sources. At 1212, integration data may be filtered against data representing one or more brand intelligence profiles to identify compatible subsets of multiple data sources with which to integrated branded content. At 1214, a subset of application programming interfaces may be activated to selectively transmit subsets of integration data to integrate with a subset of multiple data sources.

Figure 13:
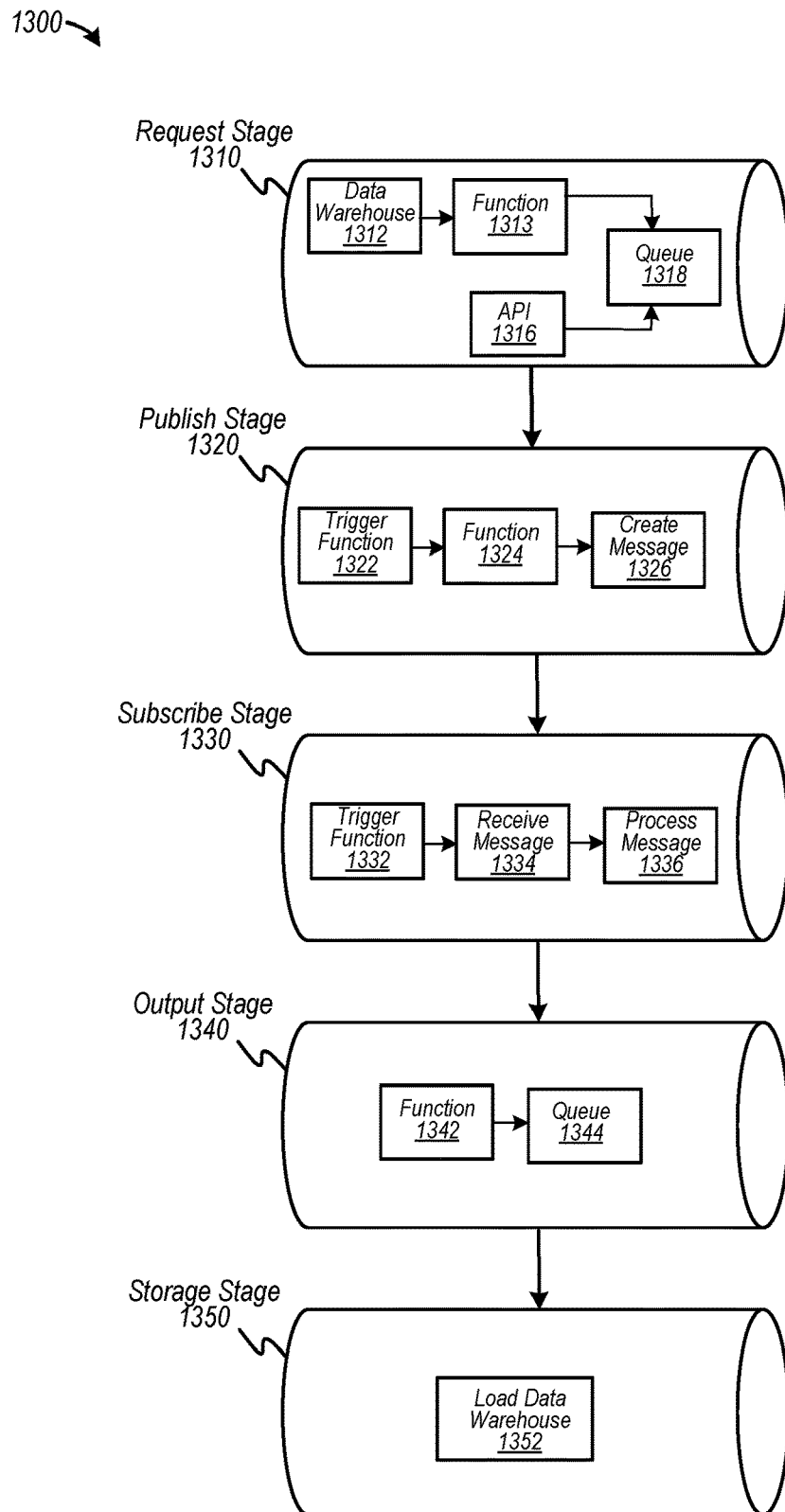
FIG. 13 is a diagram depicting stages of electronic messaging to facilitate correlation of event data across multiple data streams to identify compatible distributed data files with which to integrate data, according to some examples.

FIG. 13 is a diagram depicting stages of electronic messaging to facilitate correlation of event data across multiple data streams to identify compatible distributed data files with which to integrate data, according to some examples. Diagram 1300 depicts functional stages of implementing a messaging service to implement various functions described herein. A request stage 1310 depicts functions to implement requests to access data originating at various distributed data sources. In one example, requests may be stored as files in queue 1318, which may be implemented as cloud storage (e.g., Google cloud storage). Files may be populated in queue 1318 responsive to activation of an API 1316 or a function 1314 (e.g., a Google cloud function application) that extracts the files from a data warehouse 1312. An example of a data warehouse 1312 is a data warehouse developed and maintained by Snowflake, Inc., of San Mateo, California.

A publish stage 1320 depicts functions to implement publisher processing functions to generate a publish-subscribe message. Trigger function 1322 may be configured to schedule operation of function 1324, which, when activated, can access data from queue 1318. In one example, trigger function 1322 may be implemented with a Google cloud scheduler application, and function 1324 may be implemented with a Google cloud function application. Create message 1326 may be implemented as a cloud platform application, such as a Google Pub/Sub application, that is configured to transmit a publish-subscribe message.

A subscribe stage 1330 depicts functions to implement subscriber processing functions to receive and process a publish-subscribe message. Trigger function 1332 may be configured to schedule operation of function 1334, which, when activated, can receive data associated with a publish-subscribe message. Process message 1336 may be implemented as a cloud platform application, such as a cloud function application, that may be configured to execute instructions to process data in relation to a received publish-subscribe message.

An output stage 1340 depicts functions to store outputs generated at process message 1336. As shown, function 1342, which may be implemented as a cloud platform function, can be configured to generate one or more output file in, for example, a CSV format (or any other format) for storage in queue 1344. For example, CSV-formatted files may be generated to include three files for video channels, playlists, and video metadata, or any other data.

A storage stage 1350 depicts a function to store data from output stage 1340 in a data warehouse. For example, load data warehouse 1352 may be configured to load data from a cloud platform storage in output stage 1340 in data lake or a data warehouse, whereby the loaded data may be accessed to generate reports, predict brand intelligence parameters, and other functions.

Figure 14:
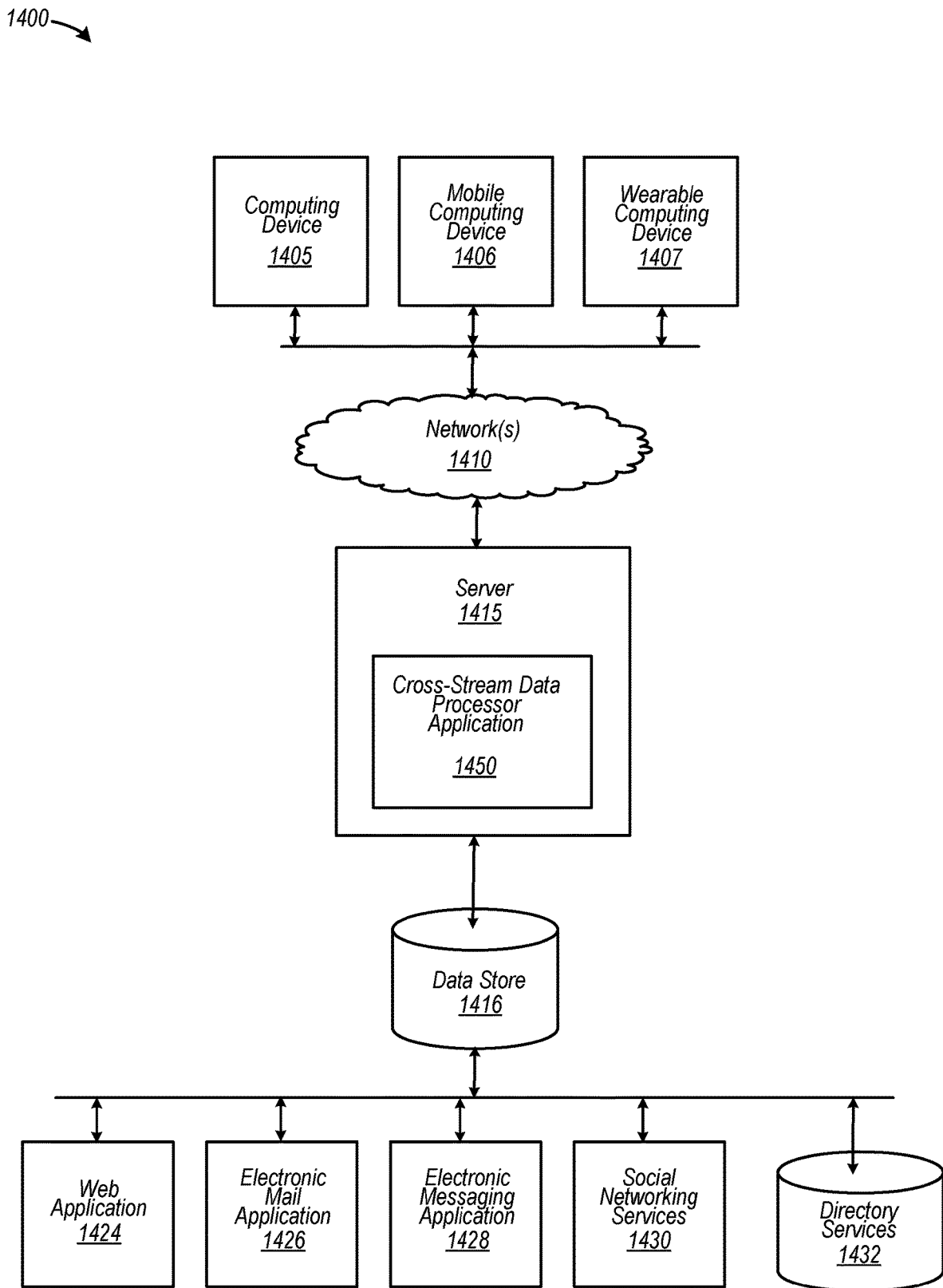
FIG. 14 depicts an example of a system architecture to provide a computing platform to host an application to analyze electronic messages including data associated with distributed data files in a distributed computing system, according to an example.

FIG. 14 depicts an example of a system architecture to provide a computing platform to host an application to analyze electronic messages including data associated with distributed data files in a distributed computing system, according to an example. Data constituting executable instructions (e.g., remote applications) and other content, such as text, video, audio, etc. may be stored in (or exchanged with) various communication channels or storage devices. For example, various units of content may be stored using one or more of a web application 1424 (e.g., a public data source, such as a new aggregation web site), an email application service 1426, an electronic messaging application 1428 (e.g., a texting or messenger application), social networking services 1430 and a services platform and repository 1432 (e.g., cloud computing services provided by Google® cloud platform, an AWS® directory service provided by Amazon Web Services, Inc., or any other platform service). A server 1415 may implement a cross-stream data processor application 1450 to correlate event data over multiple data streams, classify distributed data at multiple data sources, and modify the distributed data as a function of compatibility. As an example, server 1415 may be a web server providing the applications 1450 and 1452 via networks 1410. As an example, a client computing device may be implemented and/or embodied in a computer device 1405, a mobile computing device 1406 (e.g., a smart phone), a wearable computing device 1407, or other computing device. Any of these client computing devices 1405 to 1407 may be configured to transmit content (e.g., as electronic text or documents, video content, audio content, or the like) from the store 1416, and may be configured to receive content (e.g., other electronic content).

Figure 15:
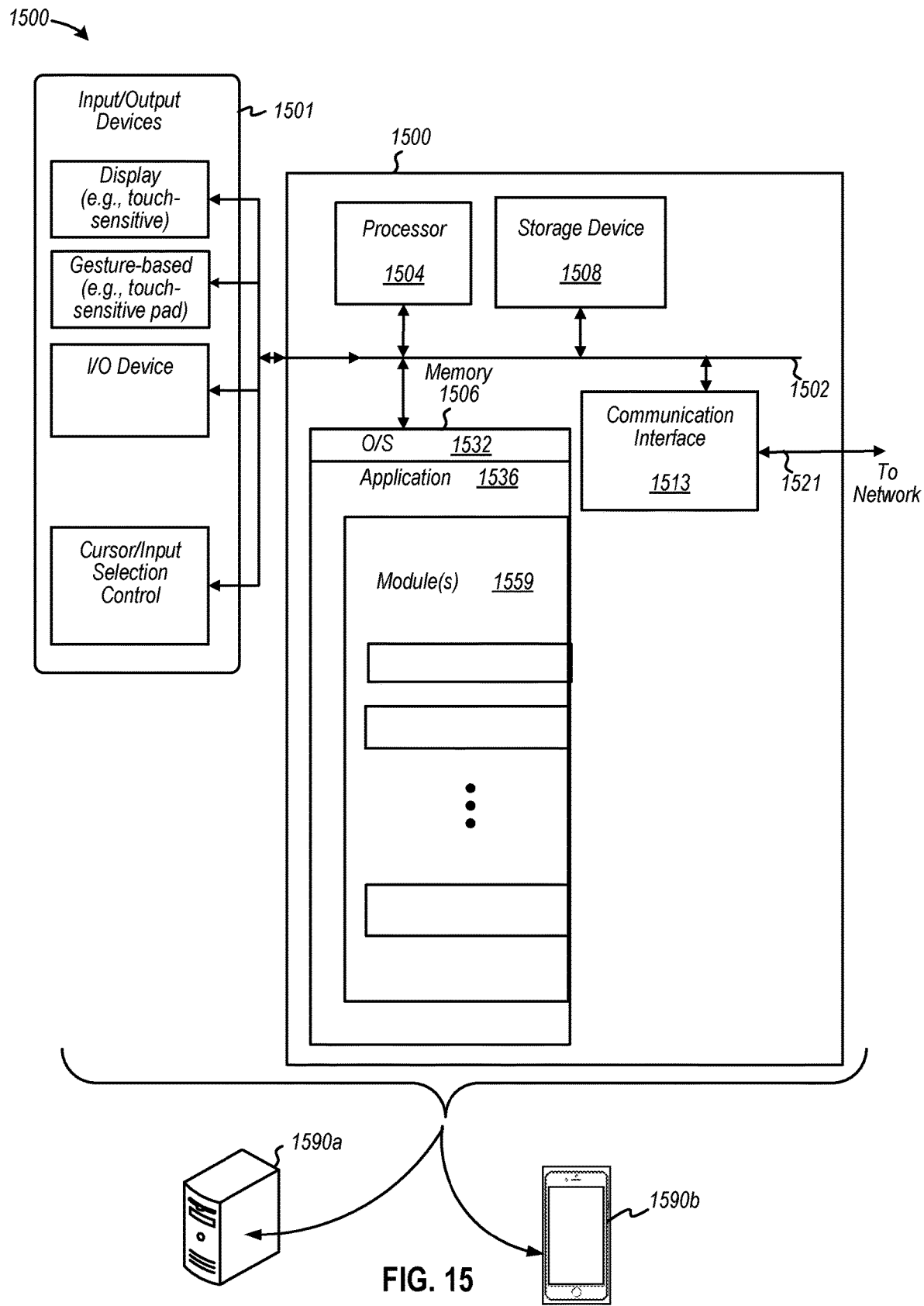
FIG. 15 illustrates examples of various computing platforms configured to provide various functionalities to components of an electronic message platform, according to some examples.

FIG. 15 illustrates examples of various computing platforms configured to provide various functionalities to components of an electronic message platform 1500 configured to analyze electronic message data, correlate event data over multiple data streams, classify distributed data received in the analyze electronic message, and modify the distributed data as a function of compatibility. Computing platform 1500 may be used to implement computer programs, applications, methods, processes, algorithms, or other software, as well as any hardware implementation thereof, to perform the above-described techniques.

In some cases, computing platform 1500 or any portion (e.g., any structural or functional portion) can be disposed in any device, such as a computing device 1590*a*, mobile computing device 1590*b*, and/or a processing circuit in association with initiating any of the functionalities described herein, via user interfaces and user interface elements, according to various examples.

Computing platform 1500 includes a bus 1502 or other communication mechanism for communicating information, which interconnects subsystems and devices, such as processor 1504, system memory 1506 (e.g., RAM, etc.), storage device 1508 (e.g., ROM, etc.), an in-memory cache (which may be implemented in RAM 1506 or other portions of computing platform 1500), a communication interface 1513 (e.g., an Ethernet or wireless controller, a Bluetooth controller, NFC logic, etc.) to facilitate communications via a port on communication link 1521 to communicate, for example, with a computing device, including mobile computing and/or communication devices with processors, including database devices (e.g., storage devices configured to store atomized datasets, including, but not limited to triplestores, etc.). Processor 1504 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1500 exchanges data representing inputs and outputs via input-and-output devices 1501, including, but not limited to, keyboards, mice, audio inputs (e.g., speech-to-text driven devices), user interfaces, displays, monitors, cursors, touch-sensitive displays, touch-sensitive input and outputs (e.g., touch pads), LCD or LED displays, and other I/O-related devices.

Note that in some examples, input-and-output devices 1501 may be implemented as, or otherwise substituted with, a user interface in a computing device associated with, for example, a user account identifier in accordance with the various examples described herein.

According to some examples, computing platform 1500 performs specific operations by processor 1504 executing one or more sequences of one or more instructions stored in system memory 1506, and computing platform 1500 can be implemented in a client-server arrangement, peer-to-peer arrangement, or as any mobile computing device, including smart phones and the like. Such instructions or data may be read into system memory 1506 from another computer readable medium, such as storage device 1508. In some examples, hard-wired circuitry may be used in place of or in combination with software instructions for implementation. Instructions may be embedded in software or firmware. The term "computer readable medium" refers to any tangible medium that participates in providing instructions to processor 1504 for execution. Such a medium may take many forms, including but not limited to, non-volatile media and volatile media. Non-volatile media includes, for example, optical or magnetic disks and the like. Volatile media includes dynamic memory, such as system memory 1506.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1502 for transmitting a computer data signal.

In some examples, execution of the sequences of instructions may be performed by computing platform 1500. According to some examples, computing platform 1500 can be coupled by communication link 1521 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1500 may transmit and receive messages, data, and instructions, including program code (e.g., application code) through communication link 1521 and communication interface 1513. Received program code may be executed by processor 1504 as it is received, and/or stored in memory 1506 or other non-volatile storage for later execution.

In the example shown, system memory 1506 can include various modules that include executable instructions to implement functionalities described herein. System memory 1506 may include an operating system ("O/S") 1532, as well as an application 1536 and/or logic module(s) 1559. In the example shown in FIG. 15, system memory 1506 may include any number of modules 1559, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. These can be varied and are not limited to the examples or descriptions provided.

In some embodiments, modules 1559 of FIG. 15, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1559 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1559 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 1559 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
receiving different data streams via a message throughput data pipe, the different data streams being associated with multiple data sources each associated with a processor and memory, the data including at least a portion of executable instructions;
extracting features from one or portions of data or the executable instructions to form extracted features including units of data representing one or more text data, image data, and audio data, wherein extracting the features includes forming an event composite value ("ECV") based on adjusted weighting factors;
analyzing a subset of data representing the extracted features to determine event data by executing an instruction to implement one or more natural language processors, one or more image recognition processors, and one or more audio recognition processors to determine the event data by processing the subset of data representing the extracted features, the subset of data being determined based on an algorithm configured to identify cosine similarity, wherein the algorithm uses the cosine similarity to determine similarity between the subset of data representing the extracted features;
generating data representing an event based on the subset of data representing the extracted features as a function of the adjusted weighting factors;
identifying data representing a subset of the multiple data sources associated with the event;
calculating compatibility of a subset of integration data at a cross-stream data processor with distributed data files at the subset of the multiple data sources;
implementing one or more cross-stream data processors configured to communicate event-related data across the multiple data sources; and
transmitting the subset of integration data to integrate with at least one of the subsets of the multiple data sources, at least one of the multiple data sources including a target data file configured to function in response to integration with at least a portion of the integration.

2. The method of claim 1 further comprising:
initiating extraction of the features from data files at the multiple data sources.

3. The method of claim 1 further comprising:
batching electronic messages including subsets of the extracted features to form batched electronic messages; and
executing instructions to implement the one or more natural language processors, the one or more image recognition processors, or the one or more audio recognition processors to determine the event data.

4. The method of claim 3 wherein the electronic messages are implemented in accordance with a publisher-subscriber messaging service.

5. The method of claim 3 wherein executing the instructions to implement the one or more natural language processors comprises:
filtering text terms;
applying a machine learning algorithm to generate vectors for the text terms; and
calculating data representing degrees of similarity among the vectors to identify the event data.

6. The method of claim 1 further comprising:
receiving supplemental data as event indicators into a diffusivity index controller; and
classifying the event data based on the supplemental data to characterize a rate of diffusivity among the different data streams.

7. The method of claim 6 wherein the supplemental data includes metadata in different data formats, each data format being associated with each of the subset of the multiple data sources.

8. The method of claim 6 wherein the supplemental data includes one or more of time range-related data, location-related data, and quantity-related data associated with detection of the event data in one or more of the subsets of the multiple data sources.

9. The method of claim 1 where calculating compatibility of the subset of integration data with the subset of the multiple data sources further comprising:
classifying the subset of the multiple data sources to identify one or more states defining attributes of compatibility; and
selecting automatically by the processor the integration data based on the attributes of compatibility.

10. The method of claim 9 further comprising:
integrating the integration data into data files at the subset of the multiple data sources, the integration data including one or more of executable instructions and content data integrated with the target data file to form a modified data file.

11. A system comprising:
a data store configured to receive streams of data via a network into an application computing platform; and
a processor configured to execute instructions to implement an application configured to:
receive different data streams via a message throughput data pipe, the different data streams from multiple data sources each associated with a processor and memory, the data including at least a portion of executable instructions;
extract features from one or portions of data or the executable instructions to form extracted features including units of data representing one or more text data, image data, and audio data, wherein extracting the features includes forming an event composite value ("ECV") based on adjusted weighting factors;
analyze a subset of data representing the extracted features to determine event data by executing an instruction to implement one or more natural language processors, one or more image recognition processors, and one or more audio recognition processors to determine the event data by processing the subset of data representing the extracted features, the subset of data being determined based on an algorithm configured to identify cosine similarity, wherein the algorithm uses the cosine similarity to determine similarity between the subset of data representing the extracted features;
generate data representing an event based on the subset of data representing the extracted features as a function of the adjusted weighting factors;
identify data representing a subset of the multiple data sources associated with the event;
calculate compatibility of a subset of integration data at the processor including a cross-stream data processor with distributed data files at the subset of the multiple data sources;
implement one or more cross-stream data processors configured to communicate event-related data across the multiple data sources; and
transmit the subset of integration data to integrate with at least one of the subsets of the multiple data sources, at least one of the multiple data sources including a target data file configured to function in response to integration with at least a portion of the integration.

12. The system of claim 11 wherein the processor is further configured to:
initiate extraction of the features from data files at the multiple data sources.

13. The system of claim 11 wherein the processor is further configured to:
batch electronic messages including subsets of the extracted features to form batched electronic messages; and
execute instructions to implement the one or more natural language processors, the one or more image recognition processors, or the one or more audio recognition processors to determine the event data.

14. The system of claim 13 wherein the electronic messages are implemented in accordance with a publisher-subscriber messaging service.

15. The system of claim 13 wherein the processor configured to execute the instructions to implement the one or more natural language processors is further configured to:
filter text terms;
apply a machine learning algorithm to generate vectors for the text terms; and
calculate data representing degrees of similarity among the vectors to identify the event data.

16. The system of claim 11 wherein the processor is further configured to:
receive supplemental data as event indicators into a diffusivity index controller; and
classify the event data based on the supplemental data to characterize a rate of diffusivity among the different data streams.

17. The system of claim 16 wherein the supplemental data includes metadata in different data formats, each data format being associated with each of the subset of the multiple data sources.

18. The system of claim 16 wherein the supplemental data includes one or more of time range-related data, location-related data, and quantity-related data associated with detection of the event data in one or more of the subsets of the multiple data sources.

19. The system of claim 11 wherein the processor configured to calculate compatibility of the subset of integration data with the subset of the multiple data sources is further configured to:
classify the subset of the multiple data sources to identify one or more states defining attributes of compatibility; and
select automatically at the processor the integration data based on the attributes of compatibility.

20. The system of claim 19 wherein the processor is further configured to:
integrate the integration data into data files at the subset of the multiple data sources, the integration data including one or more of executable instructions and content data integrated with the target data file to form a modified data file.

* * * * *